US011158844B2

(12) United States Patent
Zeng et al.

(10) Patent No.: US 11,158,844 B2
(45) Date of Patent: Oct. 26, 2021

(54) SHARED ELECTRODE SEGMENTS BETWEEN A STEP CELL AND A MAIN CELL OF A STEPPED BATTERY

(71) Applicant: NINGDE AMPEREX TECHNOLOGY LIMITED, Ningde (CN)

(72) Inventors: Qiao Zeng, Ningde (CN); Liangzhen Xiao, Ningde (CN); Kefei Wang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 48 days.

(21) Appl. No.: 16/183,549

(22) Filed: Nov. 7, 2018

(65) Prior Publication Data
US 2020/0044234 A1 Feb. 6, 2020

(30) Foreign Application Priority Data

Aug. 6, 2018 (CN) .......................... 201810887262.2

(51) Int. Cl.
*H01M 10/0587* (2010.01)
*H01M 10/04* (2006.01)
*H01M 10/0583* (2010.01)
*H01M 4/13* (2010.01)
*H01M 4/78* (2006.01)
*H01M 10/0525* (2010.01)

(52) U.S. Cl.
CPC ............... *H01M 4/13* (2013.01); *H01M 4/78* (2013.01); *H01M 10/0431* (2013.01); *H01M 10/0525* (2013.01); *H01M 10/0583* (2013.01); *H01M 10/0587* (2013.01)

(58) Field of Classification Search
None
See application file for complete search history.

(56) References Cited

U.S. PATENT DOCUMENTS

| 4,204,036 A | 5/1980 | Cohen et al. |
| 9,882,224 B2 * | 1/2018 | Andrew ............ H01M 10/0431 |
| 2014/0099525 A1 | 4/2014 | Kwon et al. |
| 2015/0349372 A1 | 12/2015 | Maleki et al. |
| 2019/0074535 A1 * | 3/2019 | Kawai ............... H01M 10/0585 |

FOREIGN PATENT DOCUMENTS

| CN | 103765665 A | 4/2014 |
| EP | 1724857 A1 | 11/2006 |

OTHER PUBLICATIONS

Ningde Amperex Technology Limited, Extended European Search Report, EP19189809.7, dated Dec. 13, 2019, 6 pgs.
Ningde Amperex Technology Limited, Office Action, CN201810887262.2, dated Jun. 28, 2021, 7 pgs.

\* cited by examiner

*Primary Examiner* — Jonathan Crepeau
(74) *Attorney, Agent, or Firm* — Morgan, Lewis & Bockius LLP

(57) ABSTRACT

A battery comprises a first electrode assembly including a first electrode, and a second electrode assembly disposed adjacent the first electrode assembly along a first direction. The first electrode comprises a first segment that is disposed on an outer portion of the second electrode assembly. The first electrode may further comprise a second segment electrically connected to the first segment. The second segment is disposed on an outer portion of the first electrode assembly.

12 Claims, 24 Drawing Sheets

SHARED ELECTRODE SEGMENTS BETWEEN A STEP CELL AND A MAIN CELL OF A STEPPED BATTERY

CROSS-REFERENCE TO RELATED APPLICATION

The application claims priority to Chinese Patent Application No. 201810887262.2, entitled "SHARED ELECTRODE SEGMENTS BETWEEN A STEP CELL AND A MAIN CELL OF A STEPPED BATTERY" filed on Aug. 6, 2018 at the State Intellectual Property Office of the People's Republic of China (SIPO), the disclosure of which is incorporated by reference herein in its entirety.

TECHNICAL FIELD

The present application is related generally to the field of energy storage devices, and in particular, to lithium ion batteries with stepped structures.

BACKGROUND

With the development of science and technology, various electronic products emerge and are almost indispensable in daily life. With advantages of high energy density, long cycle life, environmental friendliness and reproductively, lithium ion batteries have been widely used in various electronic products.

As modern portable electronic devices are miniaturized and designed to have various shapes, conventional are limited by their sizes and regular shapes (e.g., rectangular, cylindrical, etc.) to well fit in these electronic devices. Moreover, convectional batteries often fail to satisfy the need of these electronic devices to have high energy density, high power density, and fast charging/discharging rate with good cyclability. Accordingly, it would be desirable to have versatile batteries with good performance and can be made in irregular shapes to accommodate the need from the portable electronic devices.

SUMMARY

Conventional stepped batteries have two electrode assemblies that are stacked on each other. The electrodes used in the conventional batteries are often coated with active materials on both surfaces from head to tail. Also the step cell can be directly stacked on the main cell without sharing any electrodes between the two electrode assemblies. As a result, the active materials on some parts of the conventional batteries do not participate in any electrochemical reaction, wasting space within the batteries and reducing the energy density of the devices. Moreover, the step cell and the main cell could shift relatively to each other, jeopardizing the mechanical integrity of the devices. An object of the present application is to provide a lithium ion battery having a stepped structure including one or more segments of an electrode that are shared between a main electrode assembly and a step electrode assembly. Such lithium ion battery can provide custom shapes with improved energy density and robust mechanical integrity after many cycles.

According to a first aspect of the present application, a battery comprises a first electrode assembly including a first electrode, and a second electrode assembly disposed adjacent the first electrode assembly along a first direction. The first electrode comprises a first segment that is disposed on an outer portion of the second electrode assembly. The first electrode may further comprise a second segment electrically connected to the first segment. The second segment is disposed on an outer portion of the first electrode assembly.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles. Like reference numerals refer to corresponding parts.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of energy storage devices, such as batteries. The terms "front", "behind", "left", "right", "upper" and "lower" described in the present application are given with reference to the state where a lithium ion electric roll is disposed in the accompanying drawings.

Figure 1A:
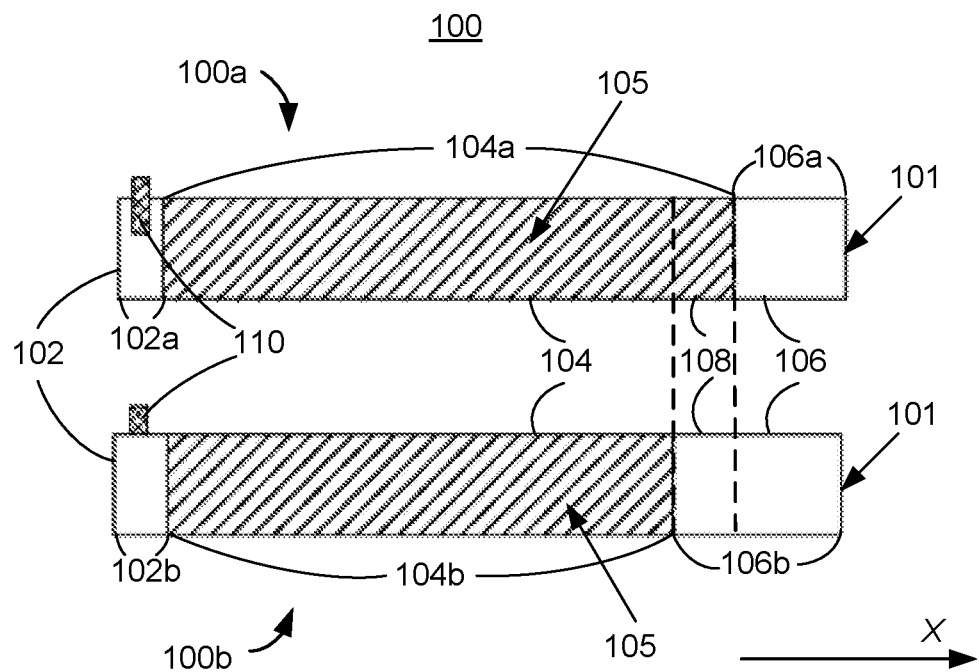
FIG. 1A includes schematic structural diagrams of a first side and a second side of a first electrode of a battery, in accordance with some embodiments.

FIG. 1A includes schematic structural diagrams of a first surface 100a and a second surface 100b of a first electrode 100 (also referred to as "an electrode sheet") of a battery, in accordance with some embodiments. The first surface 100a and the second surface 100b are two opposite surfaces (also referred to as "sides") of the first electrode 100. In some embodiments, the first electrode 100 includes a current collector 101 and active material 105 coated on at least one surface of the current collector 101.

For ease of description in the current disclosure, two ends of the first electrode 100 are respectively defined as a head (e.g., the left end portion in FIG. 1A) and a tail (e.g., a right end portion in FIG. 1A) along a length direction X. In some other embodiments as shown in FIG. 1A, the active material 105 is coated on both surfaces (e.g., the first surface 100a and the second surface 100b) of the current collector 101. In some embodiments along the length direction X, the first surface 100a includes a first head uncoated portion 102a (e.g., a head blank portion, or a head exposed portion) that is not coated with any active material 105, a first coated portion 104a, and a first tail uncoated portion 106a that are sequentially disposed adjacent to each other along the X direction. Similarly, the second surface 100b includes a second head uncoated portion 102b, a second coated portion 104b and a second tail uncoated portion 106b that are sequentially disposed adjacent to each other along the X direction. It is to be noted that in the present disclosure, the term "portion" is used interchangeably with the term "segment."

In some embodiments as shown in FIG. 1A, the first coated portion 104a and the second coated portion 104b start at the same location near the head, but end at different locations near the tail. In some embodiments, the first coated portion 104a on the first surface 100a is longer than the second coated portion 104b on the second surface 100b. As a result, the first electrode 100 includes a single-side segment 108 that has the active material 105 coated on only one surface (e.g., the first surface 100a) of the first electrode 100. In some embodiments as illustrated in FIG. 1A, the first electrode 100 includes a head uncoated portion 102 (e.g., a head exposed portion comprised of a portion of a bare current collector), a double-side portion 104, a single-side portion 108 near the tail, and a tail uncoated portion 106 (e.g., a tail exposed portion comprised of another portion of the bare current collector) that are disposed sequentially along the X direction.

In some embodiments, the first electrode 100 further includes an electrode tab 110 (also referred to as "a terminal" or "a contact") attached to the head uncoated portion 102. In some embodiments, the electrode tab 110 is attached to the first surface 100a of the first electrode 100.

Figure 1B:
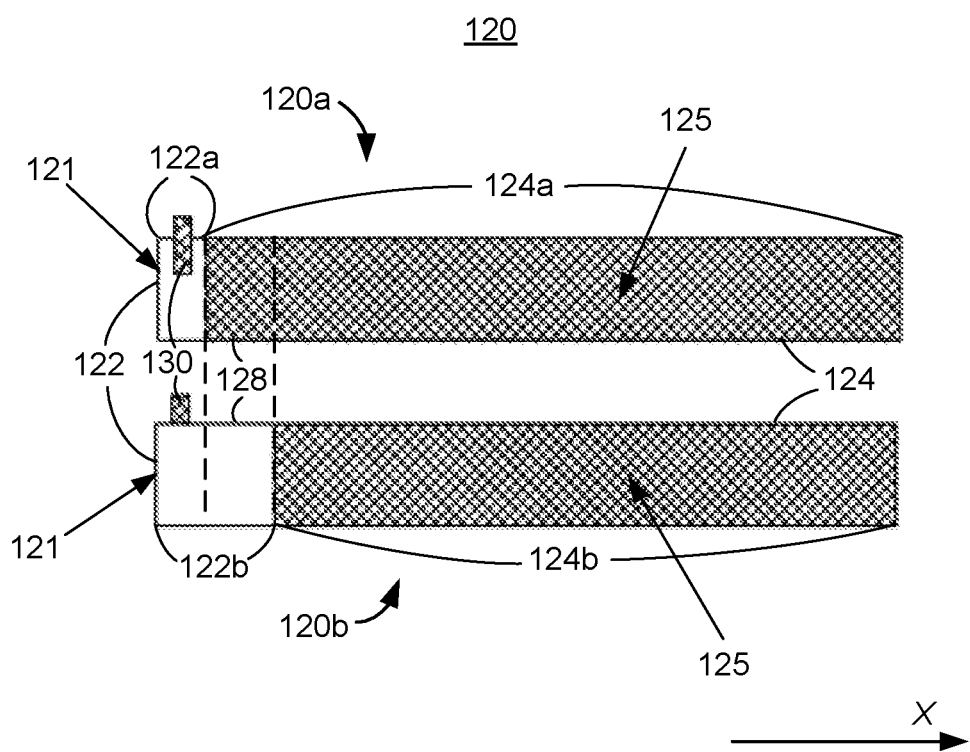
FIG. 1B includes schematic structural diagrams of a first side and a second side of a second electrode of a battery, in accordance with some embodiments.

FIG. 1B includes schematic structural diagrams of a first surface 120a and a second surface 120b of a second electrode 120 in a lithium ion battery, in accordance with some embodiments. The first surface 120a and the second surface 120b are two opposite surfaces of the second electrode 120. In some embodiments, the second electrode 120 and the first electrode 100 of FIG. 1A are two opposing electrodes of a lithium ion battery. In some embodiments, the second electrode 120 includes a current collector 121 and active material 125 coated on at least one surface of the current collector 121. In some embodiments, the active material 105 coated on the first electrode 100 is distinct from the active material 125 coated on the second electrode 120. In some embodiments, the second current collector 121 comprises a different type of material from the first current collector 101, and is disposed opposite to the first current collector 101 in a lithium ion battery.

For ease of description in the current disclosure, two ends of the second electrode 120 are respectively defined as a head (e.g., the left end portion in FIG. 1B) and a tail (e.g., a right end portion in FIG. 1B) along the length direction X. In some embodiments, the active material 125 is coated on both surfaces (e.g., the first surface 120a and the second surface 120b) of the current collector 121. In some embodiments along the length direction X, the first surface 120a includes a first head uncoated portion 122a that is not coated with any active material 125, and a first coated portion 124a disposed adjacent to the first head uncoated portion 122a along the X direction. Similarly, the second surface 120b includes a second head uncoated portion 122b, and a second coated portion 124b disposed adjacent to the second head uncoated portion 122b along the X direction.

In some embodiments as shown in FIG. 1B, the first coated portion 124a and the second coated portion 124b start at different locations (e.g., the first coated portion 124a being closer to the head), while end at the same location (e.g., at the tail of the electrode). In some embodiments, the first coated portion 124a is longer than the second coated portion 124b along the X direction. As a result, the second electrode 120 includes a single-side segment 128 that has the active material 125 coated on only one surface (e.g., the first surface 120a) of the second electrode 120. In some embodiments as illustrated in FIG. 1B, the second electrode 120 includes a head uncoated portion 122, a single-side portion 128 closer to the head, and a double-side portion 124 extending to the tail that are disposed sequentially along the X direction.

In some embodiments, the second electrode 120 further includes an electrode tab 130 attached to the head uncoated portion 122. In some embodiments, the electrode tab 130 is attached to the first surface 120a of the second electrode 120. In some embodiments, the electrode tab 130 is opposite to and made of a different material from the electrode tab 110 in the lithium ion battery.

Referring now to FIGS. 1A-1B, in some embodiments, the first electrode 100 is a cathode, and the second electrode 120 is an anode of a lithium ion battery. Alternatively, the first electrode 100 is an anode, and the second electrode sheet 120 is a cathode of the lithium ion battery. In some embodiments, the cathode includes a cathode current collector (e.g., the current collector 101 or the current collector 121) and cathode active material (e.g., the active material 105 or the active material 125) coated on the cathode current collector. In some embodiments, the anode includes an anode current collector (e.g., the current collector 101 or the current collector 121) and anode active material (e.g., the active material 105 or the active material 125) coated on the anode current collector.

In some embodiments, the cathode current collector comprises an aluminium (Al) sheet, and the anode current collector comprises a copper (Cu) sheet. In some embodiments, each of the cathode current collector and the anode current collector is bendable (e.g., can be wound into a roll), and has a thickness in a range from about 100 nm to about 5000 μm. In some embodiments, the cathode active material includes a material or a mixture of two or more materials selected from $LiCoO_2$, $LiNiO_2$, $LiMn_2O_4$, $LiFePO_4$, $LiMnPO_4$, $LiCoPO_4$, $Li_2M_xMn_{4-x}O_8$ (M=Fe, Co), $MnO_2$, $V_2O_5$, $TiS_2$, and $MoS_2$. In some embodiments, the anode active material includes one material or a mixture of two or more materials selected from carbon-based anode (e.g., graphite, graphene, carbon nanotubes, carbon nanowires, etc.), tin (Sn)-based anode (e.g., $SnO_2$, Sn-based composites, Sn-based compounds, Sn-based alloys), silicon (Si)-based anode (e.g., $SiO_2$, Si-based composites, Si-based compounds), titanium oxide ($TiO_2$, Ti-based alloys), lithium metal (Li), and iron (Fe) oxide ($Fe_2O_3$, $Fe_3O_4$, etc.). The compatibilities of working voltages and chemistry between the cathode and the anode may also be considered when selecting the cathode active material and the anode active material for a lithium ion battery. In some embodiments, the cathode active material and the anode active material have particle sizes in a range from a few nanometers (nm) to a few hundreds of micrometres (μm). In some embodiments, the cathode and anode active materials have various particle shapes, such as nanoparticles, nanotubes, nanopowders, nanoballs, nanoflakes, nanowires, etc. In some embodiments, the active material is mixed with additives and binders to form a paste which is then coated on the corresponding current collector to form the corresponding electrode. In some other embodiments, the active material can be deposited onto the corresponding current collector using any suitable method, such as chemical vapour deposition (CVD), physical vapour deposition (PVD), pulsed laser deposition (PLD), magnetron sputtering deposition, electrochemical depo, epitaxial growth, spin coating method, etc.

Figure 1C:
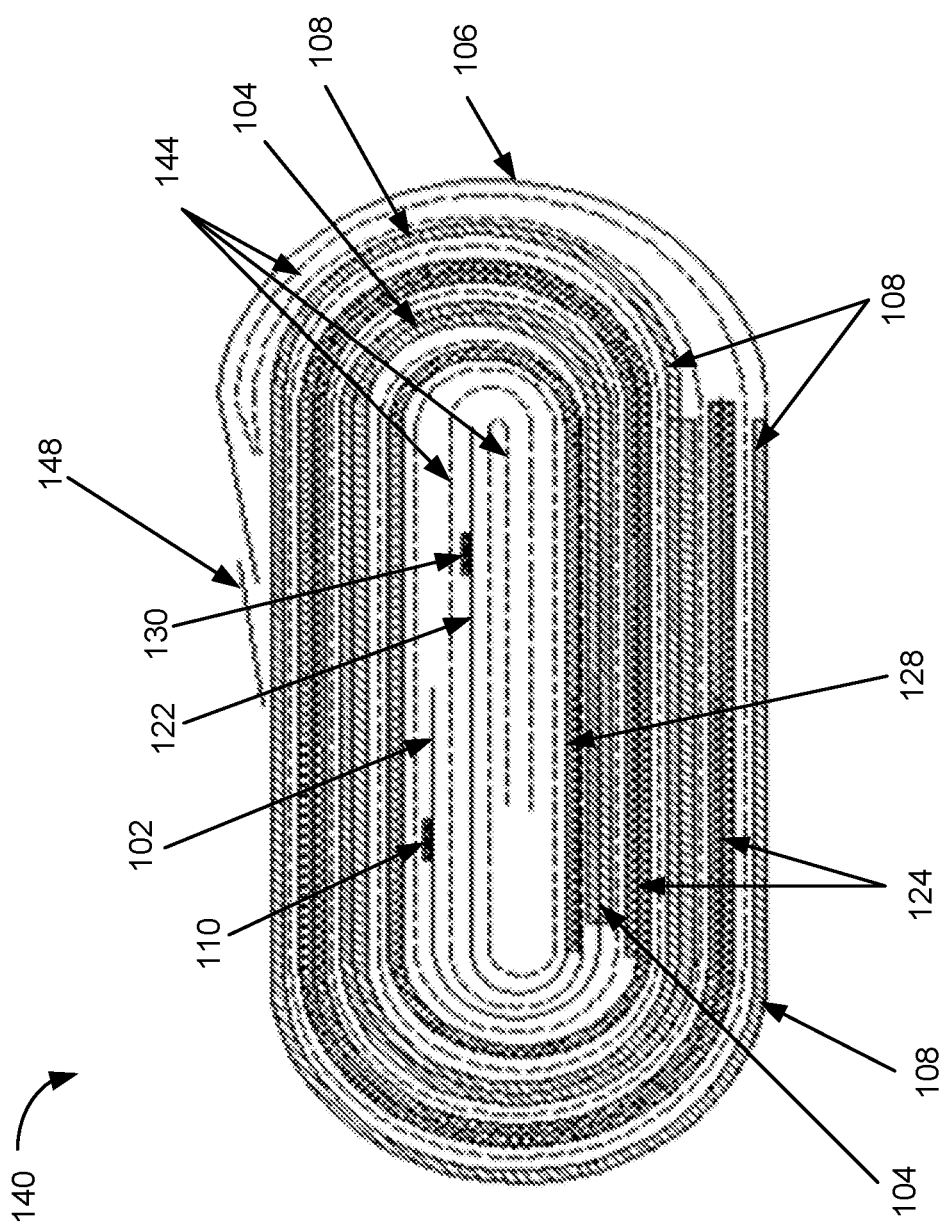
FIG. 1C is a schematic structural diagram of an electrode assembly comprising an electrode roll formed through winding of the first and second electrodes as illustrated in FIGS. 1A and 1B, in accordance with some embodiments.

FIG. 1C is a schematic structural diagram of an electrode assembly 140 comprising an electrode roll formed through winding the first electrode 100 and the second electrode 120 of FIGS. 1A and 1B, in accordance with some embodiments. In some embodiments, the electrode assembly 140 is formed by sequentially stacking the first electrode 100, a separator 144, and the second electrode 120, and winding these stacked layers to form the electrode roll as shown in FIG. 1C. In some embodiments, the winding is along a counter-clockwise direction, and starts from the head portions of the first electrode 100 and the second electrode 120. In some embodiments, the head uncoated portion 122 of the second electrode 120 is closer to the center of the electrode assembly 140 than the head uncoated portion 102 of the first electrode 100.

In some embodiments, the first electrode 100 is a cathode, and the second electrode 120 is anode. Alternatively, the first electrode 100 is an anode, and the second electrode 120 is a cathode. For example, as shown in FIG. 1C, the winding starts from the center including the separator 144, the head uncoated portion 122 and the electrode tab 130, and the head uncoated portion 102 and the anode tab 110. The separator 144 is placed between the cathode current collector and the anode current collector to avoid a direct contact between these metals. In some embodiments, the electrode tab 110 and the electrode tab 130 are arranged to avoid directly stacking on each other, so as to reduce the total thickness and volume of the electrode assembly 140 to improve the battery energy density.

As shown in FIG. 1C, when the electrode assembly 140 is formed through winding, the coated surface (e.g., 124a) of the single-side segment 128 directly faces a coated surface (e.g., 104b) of the double-side portion 104. The opposite coated surface (e.g., 104a) of the double-side portion 104 directly faces a coated surface (e.g., 124b) of the double-side portion 124. Continue winding outward, the opposite coated surface (e.g., 124a) of the double-side portion 124 directly faces the coated surface (e.g., 104b) of the double-side portion 104. The single-side segment 108 continues to wind to form an outer portion of the electrode assembly 140. In one example, the single-side segment 108 covers a top, a left side, and a bottom of the electrode assembly 140. The tail uncoated portion 106 of the cathode 142 covers a right side of the outer portion of the electrode assembly 140 and ends the winding at the top of the electrode assembly 140. A tail adhesive 148 is used to attach the tail uncoated portion 106 on the outer portion of the electrode assembly 140.

In some embodiments, the electrode assembly 140 further includes an electrolyte (not shown) disposed between the cathode and the anode. In some embodiments, the electrode assembly 140 can use a liquid electrolyte, a gel electrolyte, or a solid electrolyte. The liquid electrolyte can be one or more lithium-based salts selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBO and LIODFB dissolved in a nonaqueous solvent.

The nonaqueous solvent may include a carbonate ester compound, a carboxylic acid compound, an ether compound, other suitable organic solvent, or a combination thereof. In some embodiments, the carbonate ester compound may be a chain carbonate compound, a cyclic carbonate compound, a fluorocarbonate compound, or a combination thereof. Examples of chain carbonate compounds include diethyl carbonate (DEC), dimethyl carbonate (DMC), dipropyl carbonate (DPC), methylpropyl carbonate (MPC), ethylene carbonate (EPC), carbonic acid ethyl acetate (MEC), and combinations thereof. Examples of cyclic carbonate compounds include ethylene carbonate (EC), propylene carbonate (PC), butylene carbonate (BC), vinyl ethylene carbonate (VEC), and combinations thereof. Examples of fluorocarbonate compounds include fluoroethylene carbonate (FEC), 1,2-difluoroethylene carbonate, 1,1-difluoroethylene carbonate, and 1,1,2-tricarboxylic acid. Fluoroethylene, 1,1,2,2-tetrafluoroethylene carbonate, 1-fluoro-2-methylethyl carbonate, 1-fluoro-1-methyl-ethylene carbonate, carbonic acid 1,2-Difluoro-1-methylethylene, 1,1,2-trifluoro-2-methylethyl carbonate, trifluoromethyl ethylene carbonate, and combinations thereof. Examples of carboxylic acid ester compounds include methyl acetate, ethyl acetate, n-propyl acetate, tert-butyl acetate, methyl propionate, ethyl propionate, γ-butyrolactone, terpene lactone, valerolactone, DL-mevalonic acid lactone, caprolactone, methyl formate, and combinations thereof. Examples of ether compounds include dibutyl ether, tetraethylene glycol dimethyl ether, diethylene glycol dimethyl ether, 1,2-dimethoxyethane, 1,2-diethoxyethane, and ethoxymethoxy. Ethane, 2-methyltetrahydrofuran, tetrahydrofuran and combinations thereof. Examples of ether compounds include dibutyl ether, tetraethylene glycol dimethyl ether, diethylene glycol dimethyl ether, 1,2-dimethoxyethane, 1,2-diethoxyethane, and Ethoxymethoxyethane, 2-methyltetrahydrofuran, tetrahydrofuran, and combinations thereof. Examples of other organic solvents include dimethyl sulfoxide, 1,2-dioxolane, sulfolane, methyl sulfolane, 1,3-dimethyl-2-imidazolidinone, N-methyl-2-pyrrolidone, Formamide, dimethylformamide, acetonitrile, trimethyl phosphate, triethyl phosphate, trioctyl phosphate, phosphate esters, and combinations thereof.

In some embodiments, the separator 144 is made of one or more materials selected from polyethylene, polypropylene, polyethylene terephthalate, polyimide, and aramid. For example, polyethylene for the separator can be high-density polyethylene, low-density polyethylene, or polyethylene with ultra-high molecular weight. Polyethylene separator and polypropylene separator can effectively prevent short-circuit between the cathode current collector and the anode current collector and thus improve stability and cyclability of the battery. In some embodiments, one or both surfaces of the separator is porous, and the pours layer includes inorganic particles and binders. In some embodiments, the inorganic particles include one or more inorganic compounds selected from aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), cerium oxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, and barium sulfate. In some embodiments, the binders include one or more types of materials selected from polyvinylidene fluoride, vinylidene fluoride-hexafluoropropylene copolymer, polyamide, polyacrylonitrile, polyacrylate, polyacrylic acid, polyacrylate, carboxymethylcellulose sodium, polyvinyl pyrrolidone, polyethylene, polymethylmethacrylate, polytetrafluoroethylene, and polyhexafluoropropylene. The porous surface can improve thermal resistance and oxidation resistance of the separator. The porous surface can also have an improved electrolyte infiltration effect to provide a better contact between the separator and the cathode and anode, As illustrated herein, the cathode and the anode are designed and prepared as discussed with reference to FIGS. 1A-1B, such that in the electrode assembly 140 of FIG. 1C, all cathode active material and anode active material participate in electrochemical reactions to generate electric energy. As a result, the electrode assembly 140 can have a much improved energy density.

Figure 1D:
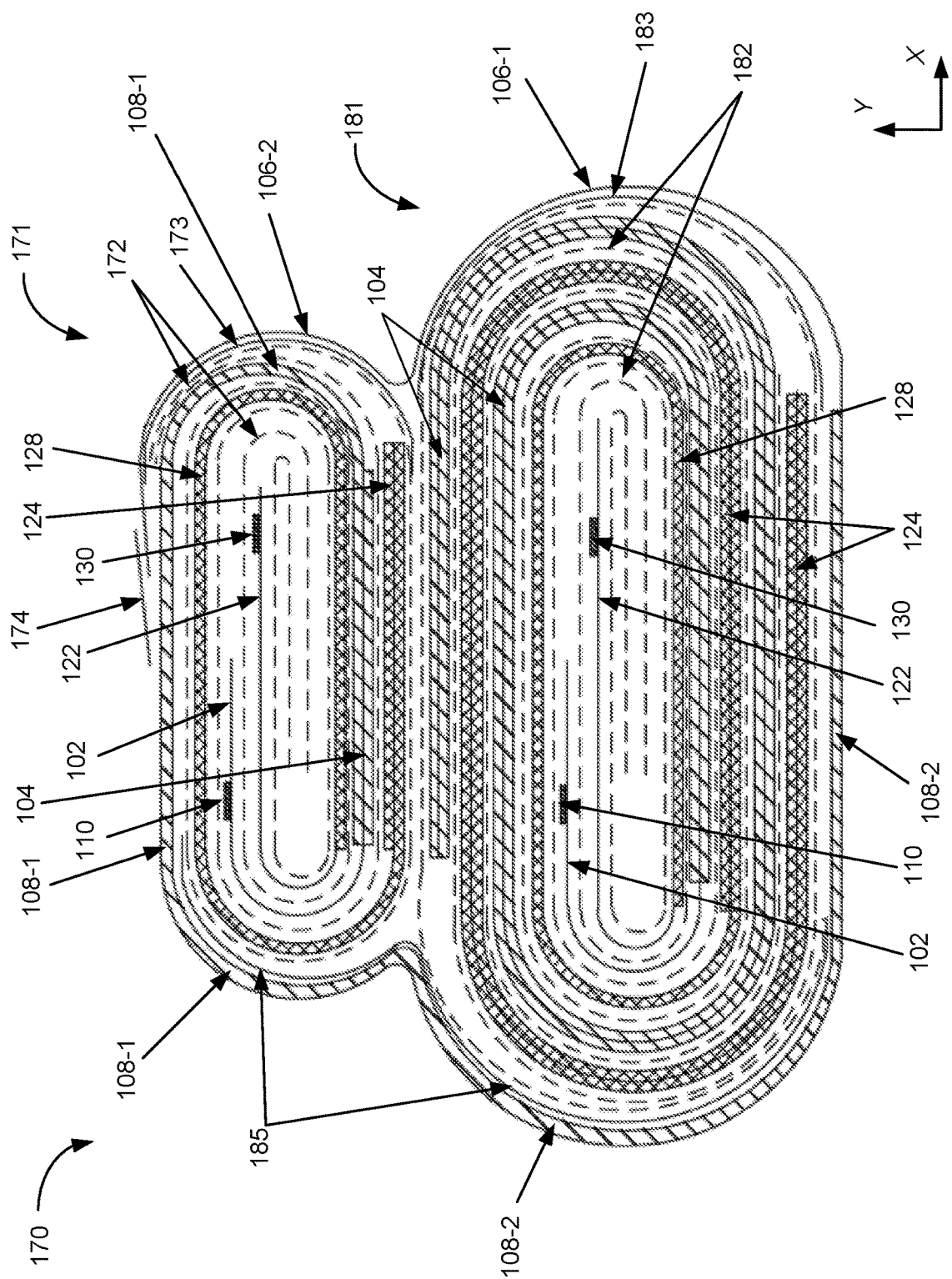
FIGS. 1D-1G are schematic structural diagrams of batteries including two electrode assemblies that are stacked to form stepped structures, in accordance with some embodiments.

FIG. 1D is a schematic structural diagram of a battery 170 including a step electrode assembly 171 stacked on a main electrode assembly 181 along a vertical Y direction to form a stepped structure, in accordance with some embodiments. In some embodiments, both the step electrode assembly 171 and the main electrode assembly 181 wind along a counterclockwise direction starting from a center to an outer layer of a respective electrode assembly. In some embodiments, the step electrode assembly 171 is shorter (or narrower) than the main electrode assembly 181 along a horizontal X direction.

In some embodiments, the step electrode assembly 171 has a similar structure as the electrode assembly 140 as discussed with reference to FIG. 1C. In some embodiments, the step electrode assembly 171 uses the first electrode 100 (FIG. 1A) and the second electrode 120 (FIG. 1B) as two opposing electrodes. In some embodiments, the first electrode 100 is a cathode, and the second electrode 120 is an anode of the step electrode assembly 171. Alternatively, the first electrode 100 is an anode, and the second electrode 120 is a cathode. In some embodiments, the step electrode assembly 171 is formed by sequentially stacking the first electrode 100, the separators 172, and the second electrode 120, and winding these stacked layers to form the electrode roll 171 as shown in FIG. 1D. In some embodiments, the first electrode 100 includes the head uncoated segment 102, the double-side segment 104, the single-side segment 108, and the tail uncoated segment 106. In some embodiments, the second electrode 120 includes the head uncoated segment 122, the single-side segment 128, and the double-side segment 124. Separators 172 (dashed lines in FIG. 1D) are disposed between the cathode and anode to prevent direct contact between the cathode and the anode.

In some embodiments, the main electrode assembly 181 uses a first electrode modified from the electrode 100 of FIG. 1A ("the modified first electrode") and the second electrode 120 of FIG. 1B as two opposing electrodes. In some embodiments, the second electrode 120 is a cathode and the modified first electrode is an anode of the electrode assembly 181. Alternatively, the second electrode 120 is an anode and the modified first electrode is a cathode. Separators 182 (dashed lines in FIG. 1D) are disposed between the cathode and anode of the main electrode assembly 181 to prevent direct contact between the cathode and the anode. In some embodiments, the main electrode assembly 181 is formed by sequentially stacking the modified first electrode, the separators 182, and the second electrode 120, and winding these stacked layers to form the electrode roll as shown in FIG. 1D.

In some embodiments, the second electrode 120 of the main electrode assembly 181 includes the head uncoated segment 122, the single-side segment 128, and the double-side segment 124. As shown in FIG. 1D, the modified first electrode includes the head uncoated segment 102 and the electrode tab 110 disposed near the center of the electrode assembly 181. The modified first electrode further includes the double-side segment 104 that connects to the head uncoated segment 102, winds within the main electrode assembly 181, and ends at the top of the main electrode assembly 181. In some embodiments, different from the first electrode 100 as shown in FIG. 1A, the modified first electrode does not include a single-side segment or a tail uncoated segment, because a part of the single-side segment 108 and a part of the tail uncoated segment 106 from the step electrode assembly 171 extend to cover an outer portion of the main electrode assembly 181 as shown in FIG. 1D as discussed below.

In some embodiments, the step electrode assembly 171 and the main electrode assembly 181 share one or more parts. In some embodiments, the shared parts are from the step electrode assembly 171. For example, in some embodiments, the single-side segment 108 of the first electrode 100 (e.g., the cathode or the anode) in the step electrode assembly 171 comprises a first single-side segment 108-1 disposed on an outer portion (e.g., including right, top, and left sides) of the step electrode assembly 171, and a second single-side segment 108-2 disposed on an outer portion (e.g., left and bottom sides) of the main electrode assembly 181. In some embodiments, separators are also shared between the step and main electrode assemblies.

In some embodiments in the step electrode assembly 171, the coated surface of the first single-side segment 108-1 is facing the coated surface of the single-side segment 128 of the opposing electrode to participate in electrochemical reactions to generate electric energy. In some embodiments in the main electrode assembly 181, the coated surface of the second single-side segment 108-2 is facing a coated surface of the double-side segment 124 of the opposing electrode to participate in electrochemical reactions to generate electric energy.

The tail uncoated segment 106 of the first electrode 100 in the step electrode assembly 171 further comprises a first segment 106-1 disposed on an outer portion (e.g., right side) of the main electrode assembly 181, and a second segment 106-2 disposed on an outer portion (e.g., right side) of the step electrode assembly 171 and ends at the top of the step electrode assembly 171. In some embodiments, a tail adhesive 174 is used to attach the tail uncoated segment 106-2 on the outer portion of the electrode assembly 171. In some embodiments as shown in FIG. 1D, the protective adhesives 173 and 183, and a shared protective adhesive 185 are disposed on respective sides of the step electrode assembly 171 and the main electrode assembly 181 to prevent precipitation and/or exposure of lithium from the battery 170. Examples of the protective adhesive materials include PET film attached to acrylic adhesive tape to provide insulation protection, binding, and fixation.

In some embodiments at the interface between the step electrode assembly 171 and the main electrode assembly 181, one coated surface of the double-side segment 124 from the step electrode assembly 171 directly faces one coated surface of the double-side segment 104 of the main electrode assembly 181 such that electrochemical reactions take place between these two opposite electrodes to generate electrical energy.

In some embodiments, the component-sharing structure of the battery 170 as discussed herein can avoid relative movement between the step electrode assembly 171 and the main electrode assembly 181 in the battery 170 to provide a better mechanical integrity. Furthermore, the battery 170 has an improved energy density compared to the conventional stepped batteries, because the design and structure of the electrodes in the battery 170 can optimize and/or maximize the coated areas having active materials that participate in electrochemical reactions to generate more electrical energy. In addition, the structure of the stepped battery 170 can mitigate the material corrosion issues in the conventional batteries thanks to the reduced active material exposure in the battery 170.

Figure 1E:
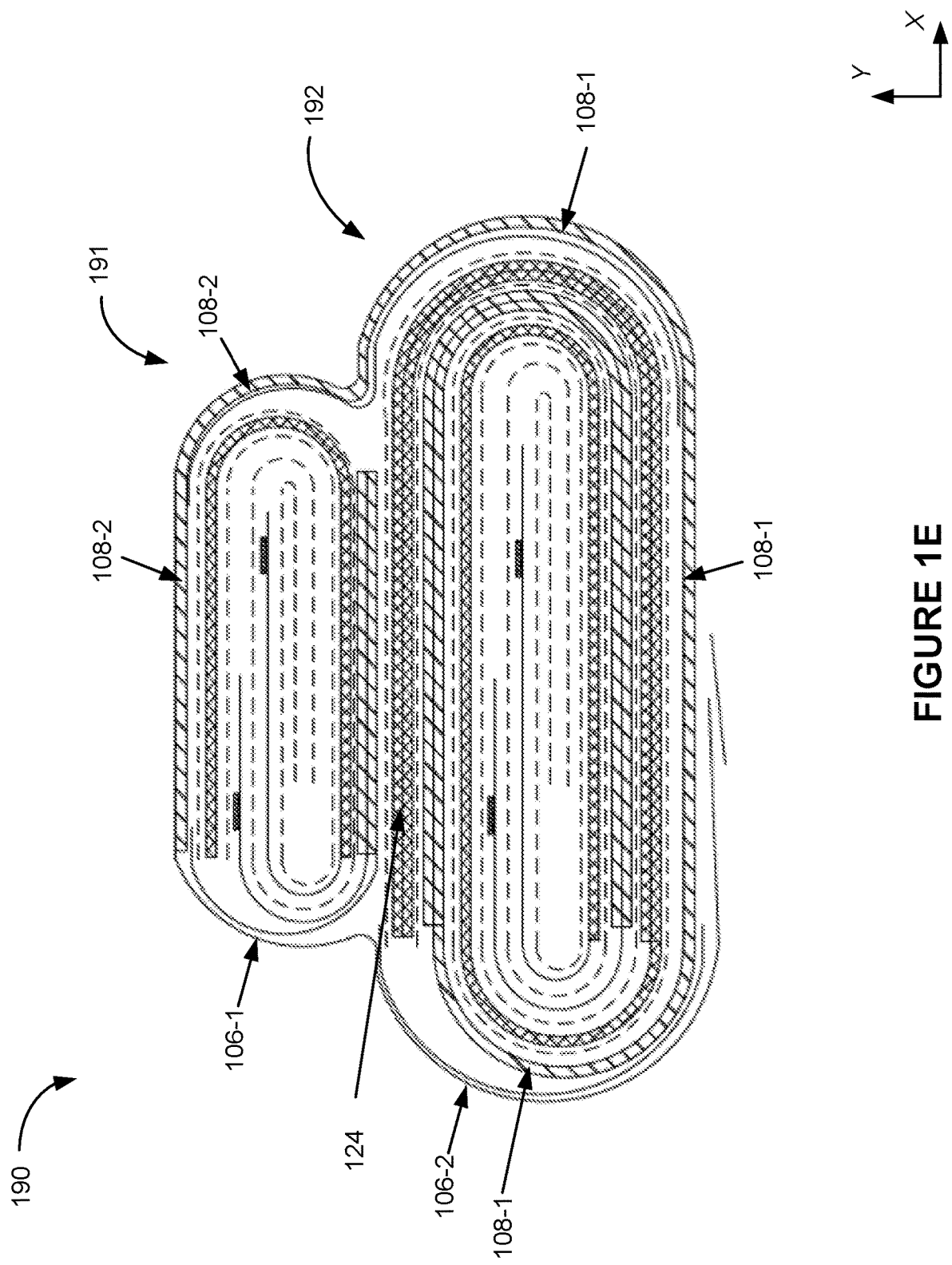

FIG. 1E is a schematic structural diagram of a battery 190 including a step electrode assembly 191 stacked on a main electrode assembly 192 along a vertical Y direction to form a stepped structure, in accordance with some embodiments. In some embodiments, both the step electrode assembly 191 and the main electrode assembly 192 wind counterclockwise and starting from a center. In some embodiments, the step electrode assembly 191 is shorter (or narrower) than the main electrode assembly 192 along a horizontal X direction. In some embodiments, different from the battery 170 as discussed with reference to FIG. 1D, the shared parts between the step electrode assembly 191 and the main electrode assembly 192 are from the main electrode assembly 192.

In some embodiments, the step electrode assembly 191 includes a first electrode including a head uncoated segment connected to a double-side segment disposed at the interface between the step electrode assembly 191 and the main electrode assembly 192. The step electrode assembly 191 further includes a second electrode opposite to the first electrode and including a head uncoated segment connected to a single-side segment. Both the first and second electrodes of the step electrode assembly 191 wind counterclockwise starting from a center toward outside.

In some embodiments, the main electrode assembly 192 includes a similar structure as the electrode assembly 140 as discussed with reference to FIG. 1C, which includes the first electrode 100 (FIG. 1A) and the second electrode 120 (FIG. 1B) as two opposing electrodes. The first electrode 100 includes an uncoated head segment, a double-side segment, a single-side segment (including a segment 108-1 disposed on the main electrode assembly 192 and a segment 108-2 disposed on an outer right and top sides of the step electrode assembly 191), and a tail uncoated segment (including a segment 106-1 disposed on an outer left side of the step electrode assembly 191 and a segment 106-2 on an outer left side of the main electrode assembly 192).

In some embodiments, the first electrode from the step electrode assembly or the main electrode assembly can be a cathode or an anode, while the second electrode being an anode or a cathode that is opposite to the first electrode. In some embodiments, the battery 190 further includes separators (dashed lines) disposed between the opposing electrodes (e.g., the first electrode and the second electrode, or the cathode and the anode). In some embodiments, the battery 190 further includes a tail adhesive to seal the end of the tail uncoated segment on the main electrode assembly 192, and protective adhesives to prevent precipitation and/or exposure of lithium from the battery 190.

In some embodiments, the step electrode assembly 191 and the main electrode assembly 192 share one or more parts of the first electrode from the main electrode assembly 192, including the above discussed single-side segments 108-1 and 108-2, and the tail uncoated segments 106-1 and 106-2. In some embodiments at the interface between the step electrode assembly 191 and the main electrode assembly 192, the double-side segment of the first electrode from the step electrode assembly 191 is facing the double-side segment of the second electrode from the main electrode assembly 192 to participate in the electrochemical reactions between the two opposing electrodes to generate electrical energy.

Figure 1F:
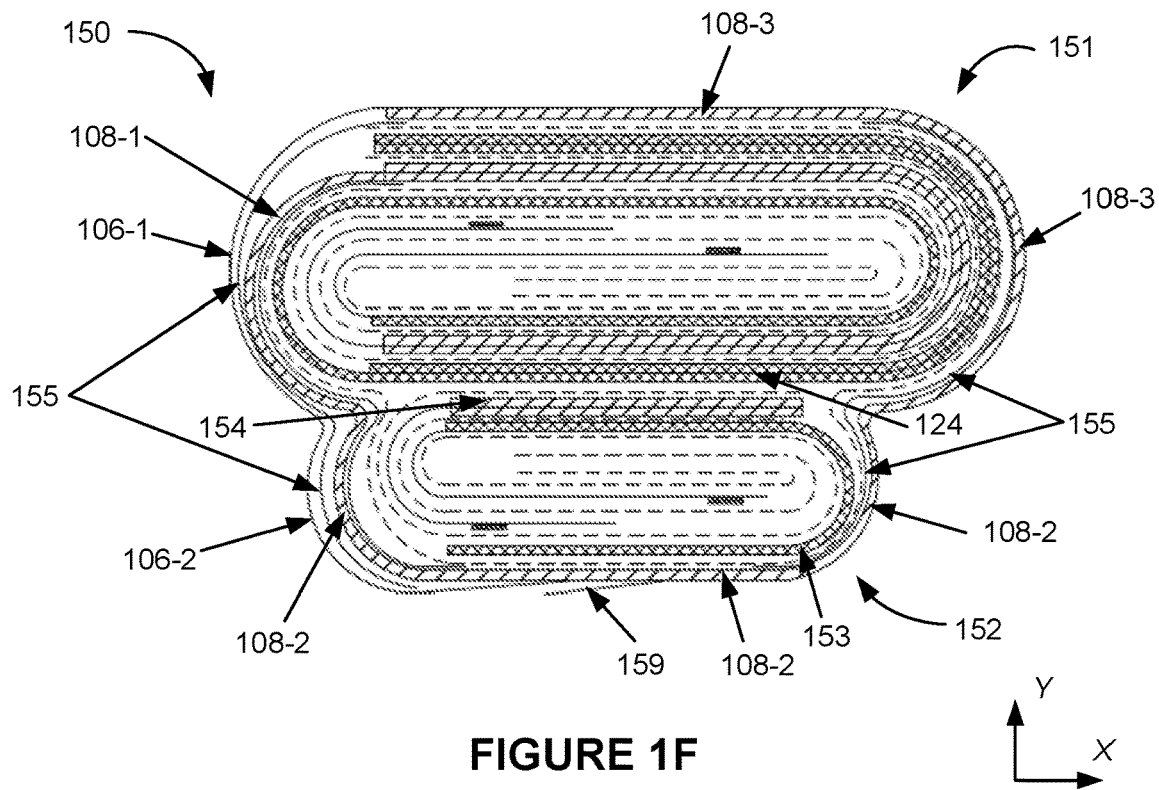

FIG. 1F is a schematic structural diagram of a battery 150 including a main electrode assembly 151 stacked on a step electrode assembly 152 along a vertical Y direction to form an inverted stepped structure, in accordance with some embodiments. In some embodiments, the first electrode, the separators, and the second electrode of the main electrode assembly 151 wind along a counterclockwise direction starting from a center to an outer layer of the main electrode assembly 151. On the other hand, the first electrode, the separators, and the second electrode of the step electrode assembly 152 wind along a clockwise direction from a center to an outer layer of the step electrode assembly 152. In some embodiments, the step electrode assembly 152 is shorter (or narrower) than the main electrode assembly 151 along a horizontal X direction.

In some embodiments, the main electrode assembly 151 has a similar structure as the electrode assembly 140 (FIG. 1C) or the step electrode assembly 171 (FIG. 1D). For example, the main electrode assembly 151 uses the first electrode 100 (FIG. 1A) and the second electrode 120 (FIG. 1B) as two opposing electrodes. The first and second electrodes in the main electrode assembly 151 include similar segments as discussed with reference to FIGS. 1A-1B and FIG. 1D. In some embodiments, the first electrode 100 is a cathode, and the second electrode 120 is an anode of the main electrode assembly 151. Alternatively, the first electrode 100 is an anode, and the second electrode 120 is a cathode.

In some embodiments, the first electrode of the step electrode assembly 152 includes a head uncoated segment winding clockwise outward and a double-side segment 154 disposed on the top side of the step electrode assembly 152. In some embodiments, the second electrode opposite to the first electrode includes a head uncoated segment winding clockwise outward, and a single-side segment 153 disposed on the top side and opposite to the double-side segment of the first electrode. The single-side segment 153 of the second electrode further winds clockwise to be disposed on the right side and the bottom side of the step electrode assembly 152. In some embodiments, the first electrode is a cathode, and the second electrode is an anode of the step electrode assembly 152. Alternatively, the first electrode is an anode, and the second electrode is a cathode of the step electrode assembly 152.

In some embodiments, the main electrode assembly 151 and the step electrode assembly 152 share one or more parts. For example, in some embodiments, the single-side segment 108 of the first electrode 100 in the main electrode assembly 151 comprises a first single-side segment 108-1 disposed on a portion (e.g., the left side) of the main electrode assembly 151, a second single-side segment 108-2 disposed on a portion (e.g., left, bottom, and right sides) of the step electrode assembly 152, and a third single-side segment 108-3 disposed on a portion (e.g., the right and top sides) of the main electrode assembly 151. In some embodiments, the second single-side segment 108-2 of the first electrode 100 extending from the main electrode assembly 151 is facing the single-side segment 153 of the second electrode from the step electrode assembly 152 to participate in electrochemical reactions between these two opposite electrodes to generate electric energy.

In some embodiments, the tail uncoated segment 106 of the first electrode 100 in the main electrode assembly 151 comprises a first segment 106-1 disposed on an outer portion (e.g., left side) of the main electrode assembly 151, and a second segment 106-2 disposed on an outer portion (e.g., left side) of the step electrode assembly 152, and ends at the bottom of the step electrode assembly 152. In some embodiments, a tail adhesive 159 is used to attach the tail uncoated segment 106-2 on the outer bottom portion of the step electrode assembly 152. In some embodiments as shown in FIG. 1F, the main electrode assembly 151 and the step electrode assembly 152 share the protective adhesives 155 on left and right sides to prevent precipitation and/or exposure of lithium from the battery 150.

In some embodiments at the interface between the main electrode assembly 151 and the step electrode assembly 152, one coated surface of the double-side segment 124 from the step electrode assembly 151 directly faces one coated surface of the double-side segment 154 of the main electrode assembly 152 such that electrochemical reactions take place between these two opposite electrodes to generate electrical energy.

Figure 1G:
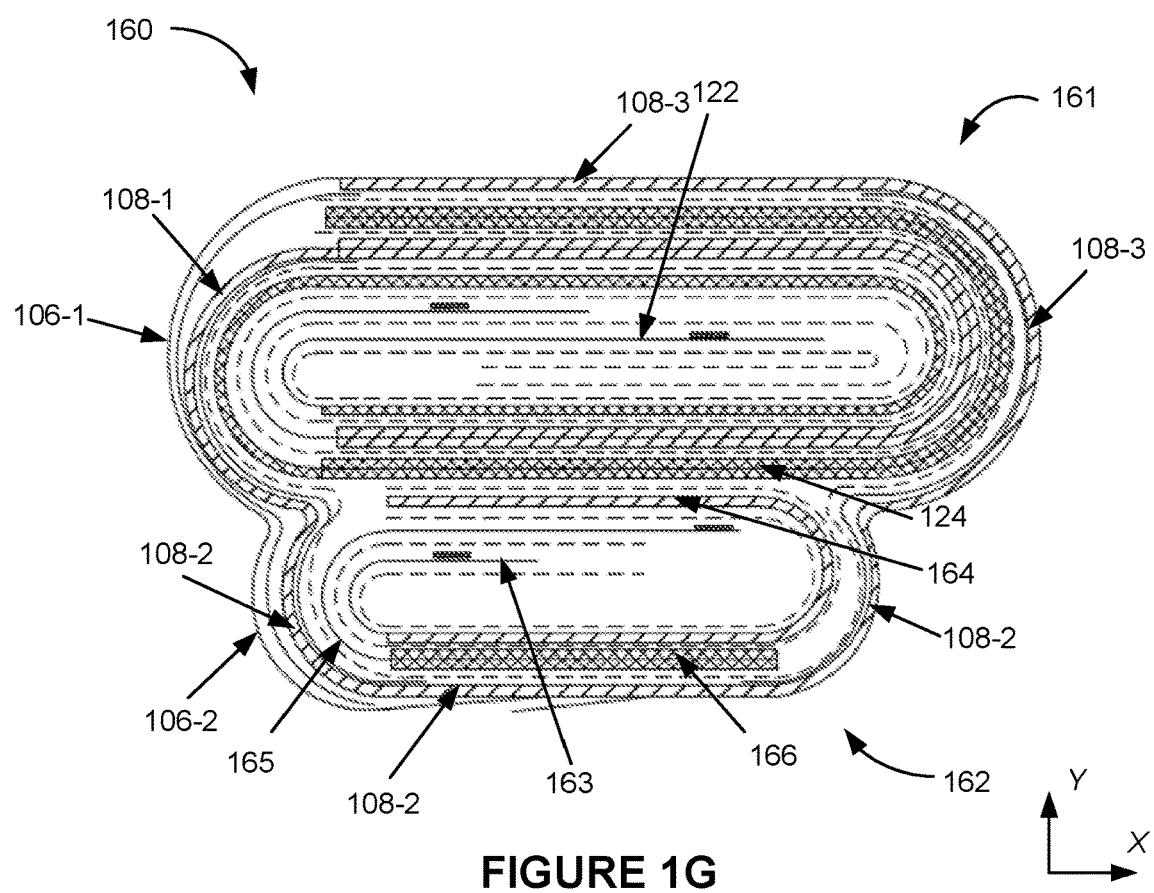

FIG. 1G is a schematic structural diagram of a battery 160 including a main electrode assembly 161 stacked on a step electrode assembly 162 along a vertical Y direction to form an inverted stepped structure, in accordance with some embodiments. In some embodiments, both the main electrode assembly 161 and the step electrode assembly 162 wind along a counterclockwise direction starting from a center to an outer layer of a respective electrode assembly. In some embodiments, the step electrode assembly 162 is shorter (or narrower) than the main electrode assembly 161 along a horizontal X direction.

In some embodiments, the main electrode assembly 161 has a similar structure as the electrode assembly 140 (FIG. 1C), the step electrode assembly 171 (FIG. 1D), or the main electrode assembly 151 (FIG. 1F). For example, the main electrode assembly 161 includes the first electrode 100 (FIG. 1A) and the second electrode 120 (FIG. 1B) as two opposing electrodes which have similar segments as discussed with reference to FIGS. 1A-1B and FIGS. 1D-1F. In some embodiments, a first electrode of the step electrode assembly 162 includes a head uncoated segment 163 and a single-side segment 164 that wind counterclockwise outward. A second electrode opposite to the first electrode in the step electrode assembly 162 includes a head uncoated segment 165 and a double-side segment 166 that wind counterclockwise outward. In some embodiments, the first electrode in the main electrode assembly 161 and the step electrode assembly 162 is a cathode, and the second electrode is an anode. Alternatively, the first electrode is an anode and the second electrode is a cathode.

In some embodiments, the battery 160 further includes separators (dashed lines) disposed between the opposing electrodes (e.g., the first electrode and the second electrode, or the cathode and the anode). In some embodiments, the battery 160 further includes a tail adhesive to seal the end of the tail uncoated segment on the step electrode assembly 162, and protective adhesives to prevent precipitation and/or exposure of lithium from the battery 160.

In some embodiments, the main electrode assembly 161 shares with the step electrode assembly 162 the same parts as discussed with reference to FIG. 1F. For example, the single-side segment 108 of the first electrode in the main electrode assembly 161 includes a first single-side segment 108-1 disposed on the left side of the main electrode assembly 161, a second single-side segment 108-2 disposed on the left, bottom, and right sides of the step electrode assembly 162, and a third single-side segment 108-3 disposed on the right and top sides of the main electrode assembly 161. In some embodiments, the tail uncoated segment 106 of the first electrode in the main electrode assembly 161 includes a first segment 106-1 disposed on an outer left side of the main electrode assembly 161, and a second segment 106-2 disposed on an outer left side of the step electrode assembly 162, and ends at the bottom of the step electrode assembly 162. In some embodiments at the interface between the main electrode assembly 161 and the step electrode assembly 162, one coated surface of the double-side segment 124 of the second electrode from the step electrode assembly 161 directly faces the coated surface of the single-side segment 164 of the first electrode from the main electrode assembly 162 such that electrochemical reactions take place between these two opposite electrodes to generate electrical energy.

In some embodiments, the center of the main electrode assembly 161 and the center of the step electrode assembly 162 have opposite polarities. For example, the center of the main electrode assembly 161 has the head uncoated segment 122 of the second electrode 120 (either a cathode or an anode), whereas the center of the step electrode assembly 162 has the head uncoated segment 163 of the first electrode (either an anode or a cathode) that has the opposite polarity to the second electrode at the center of the main electrode assembly 161.

Figure 2C:
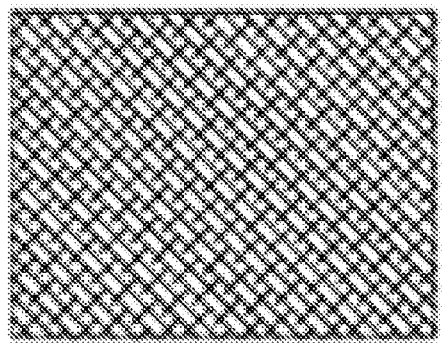
FIG. 2C is a schematic structural diagram of a separator disposed between two opposing electrodes as illustrated in FIGS. 2A-2B of a battery, in accordance with some embodiments.
Figure 2B:
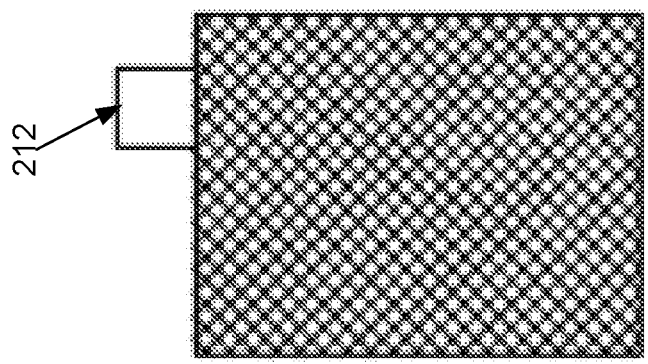
FIGS. 2A-2B are schematic structural diagrams of a first electrode and a second electrode opposite to the first electrode of a battery, in accordance with some embodiments.
Figure 2A:
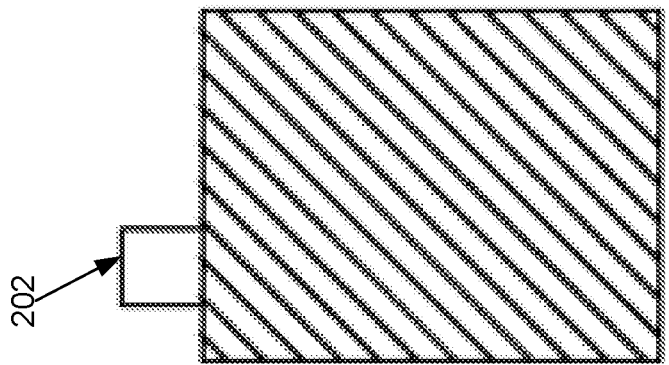

FIGS. 2A-2B include schematic structural diagrams of a first electrode 200 and a second electrode 210 opposite to the first electrode 200 of a battery (e.g., a lithium ion battery), in accordance with some embodiments. In some embodiments, the first electrode 200 includes a first current collector and first active material coated on the first current collector, and the second electrode 210 includes a second current collector and second active material coated on the second current collector. In some embodiments, a first tab 202 is an extended portion of the first current collector, and a second tab 212 is an extended portion of the second current collector. In some embodiments, the first tab 202 and the second tab 212 may be preserved from respective metal sheets when cutting the first current collector and the second current collector out from the respective metal sheets. In some embodiments, the first electrode 200 is a cathode and the second electrode 210 is an anode of the battery. Alternatively, the first electrode 200 is an anode and the second electrode 210 is a cathode of the battery. FIG. 2C is a schematic structural diagram of a separator 220 disposed between two opposing electrodes as illustrated in FIGS. 2A-2B of the battery. In some embodiments, the cathode, the anode, and the separator are made using respective materials as discussed herein.

Figure 2D:
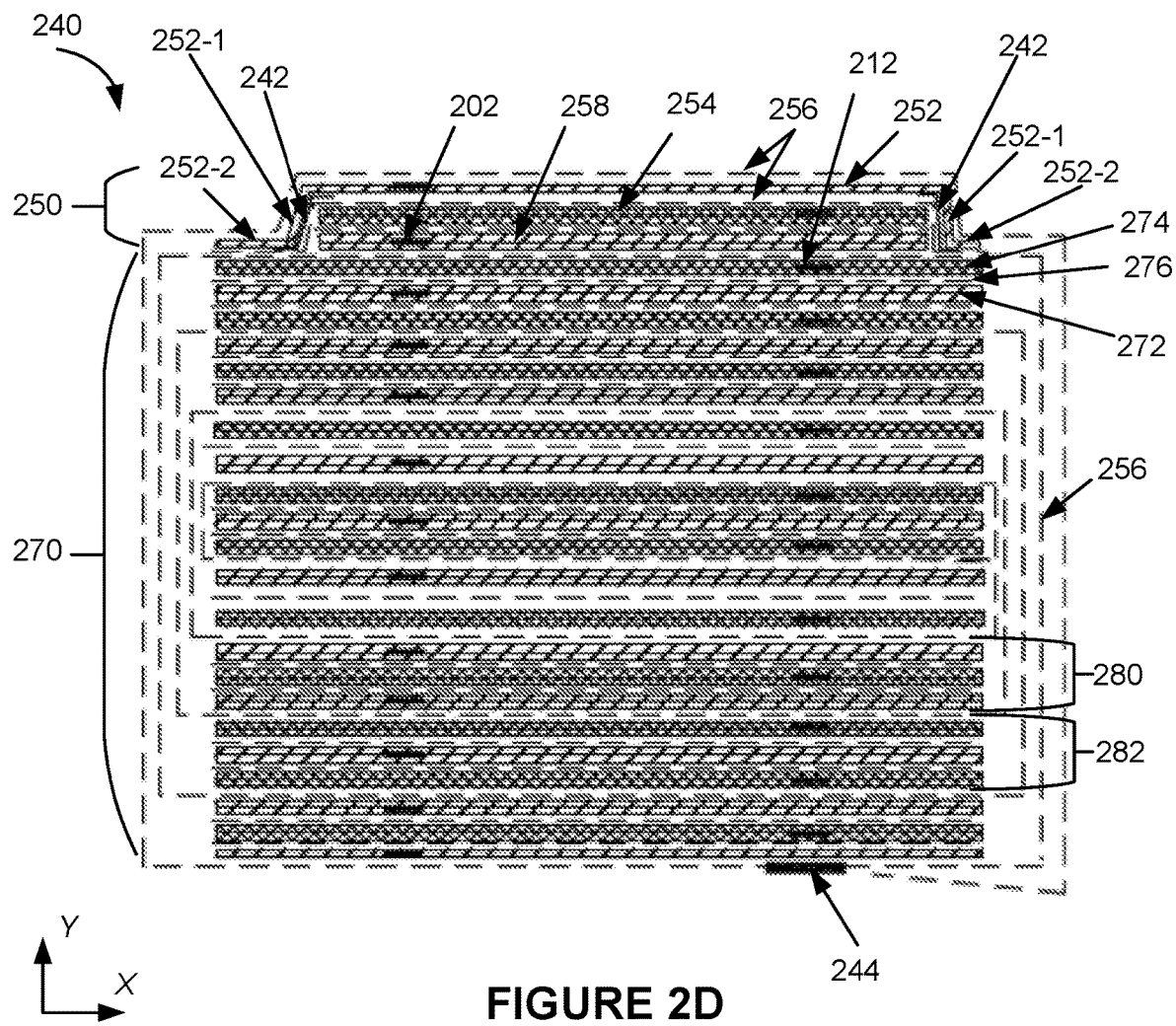
FIG. 2D is a schematic structural diagram of a battery including two stacking cells that are further stacked to form a stepped structure, in accordance with some embodiments.

FIG. 2D is a schematic structural diagram of a battery 240 including two stacking cells, e.g., a step cell 250 and a main cell 270, that are further stacked along the Y direction to form a stepped structure, in accordance with some embodiments. In some embodiments, the step cell 250 is shorter (or narrower) than the main cell 270 along the X direction. In some embodiments, the step cell 250 is formed by alternatingly stacking a single-side first electrode 252 (e.g., the first electrode 200 of FIG. 2A), a double-side second electrode 254 (e.g., the second electrode 210 of FIG. 2B) opposite to the first electrode 252, and a double-side first electrode 258 (e.g., the first electrode 200 of FIG. 2A) opposite to the second electrode 254 along the Y direction. In some embodiments, separators 256 are disposed between adjacent first and second electrodes. In some embodiments, the main cell 270 is formed by alternatingly stacking a plurality of second electrodes 274 (e.g., the second electrode 210, FIG. 2B) and a plurality of first electrodes 272 (e.g., the first electrode 100, FIG. 2A) along the Y direction. In some embodiments, separators 276 are disposed between adjacent first and second electrodes.

In some embodiments, the first electrode 252 of the step cell 250 includes side segments 252-1 that are disposed on two sides of the step cell 250. In order to prevent lithium precipitation and/or exposure, protective adhesives 242 are used to seal the sides of the protruding steps of the step cell 250. In some embodiments, the first electrode 252 of the step cell 250 further includes shared segments 252-2 that are disposed over end portions of the second electrode 274 of the main cell 270. The shard segments 252-2 of the first electrode 252 and the first electrode 258 of the step cell 250 can have electrochemical intercalation with the second electrode 274 of the main cell 270 at the interface between the step cell 250 and the main cell 270 to generate more electrical energy. In some embodiments, the first electrodes 252 and 258 can be either a cathode or an anode of the step cell 250, correspondingly, the second electrode 274 can be either an anode or a cathode of the main cell 270. In some embodiments, separators are also shared between the step and main electrode assemblies.

Figure 2E:
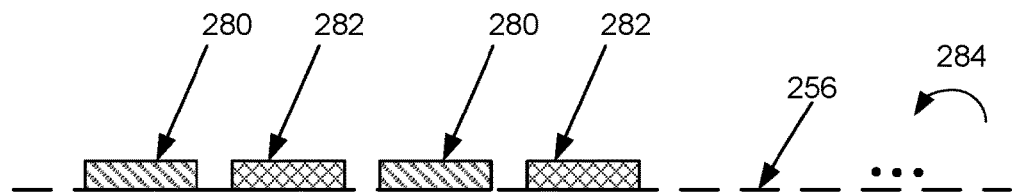
FIG. 2E is a schematic diagram illustrating a process of forming a battery from a plurality of cells via Z-shape stacking or winding, in accordance with some embodiments.

In some embodiments, the first electrodes and the second electrodes are alternating, i.e., a first electrode, a separator, a second electrode, a separator, a first electrode . . . to directly stack to form the battery 240. In some embodiments as illustrated in FIG. 2E, a plurality of cells (e.g., cells 280, 282) can be disposed on a continuous and long separator.

Each cell of the plurality of cells may include one or more first electrodes and one or more second electrodes alternatingly stacked, e.g., to form respective cells. The battery 240 can then be formed from the plurality of cells disposed on the continuous and long separator via Z-shape stacking. In some embodiments, a plurality of bi-cells, such as bi-cells 280 including first electrode/separator/second electrode/separator/first electrode, or bi-cells 282 including second electrode/separator/first electrode/separator/second electrode, are disposed onto a continuous and long separator 256 via hot pressing, as illustrated in FIG. 2E. The battery 240 can then be formed from the bi-cells on the separator through a winding 284 process.

In some embodiments, the battery 240 includes first tabs 202 on the first electrodes and second tabs 212 on the second electrodes. In some embodiments, the main cell 270 further includes a protective adhesive 244 attached to the bottom of the main cell 270 at a position corresponding to the positions of the electrode tabs, such that the protective adhesive 244 can prevent any sharp metal defects of the tabs, e.g., welding burrs and/or cutting burrs, from penetrating the packaging film of the battery 240 and forming a contact with a metal layer of the packaging film, e.g., an aluminum (Al) layer.

Figure 3A:
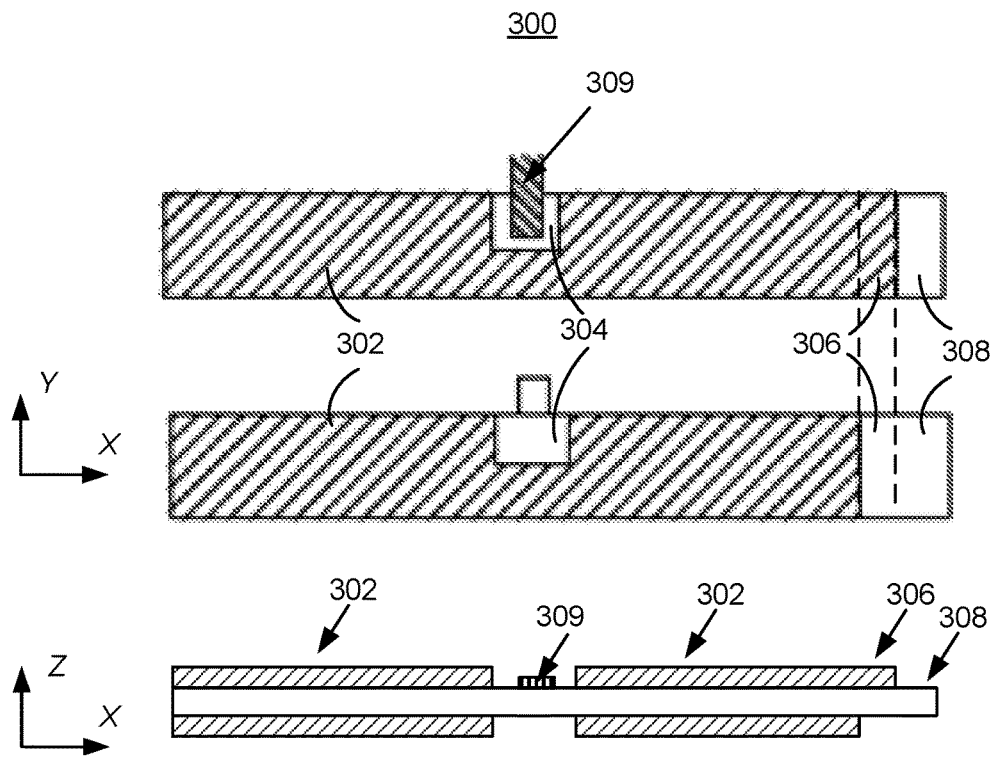
FIG. 3A includes schematic structural diagrams of two sides and a cross-sectional view of a first electrode of a battery, in accordance with some embodiments.

FIG. 3A includes schematic structural diagrams of two sides (e.g., surfaces) and a cross-section view of a first electrode 300 of a battery, in accordance with some embodiments. For ease of description in the current disclosure, two ends of the first electrode 300 are respectively defined as a head (e.g., the left end portion in FIG. 3A) and a tail (e.g., a right end portion in FIG. 3A) along a length direction X. In some embodiments, the first electrode 300 includes a head double-side segment 302 which have active material coated on both sides of the current collector, a tab opening area 304 that is uncoated (e.g., a portion of a bare electrode current collector), a tab 309 attached to the tab opening area 304 (with an embedded tab (ETS) structure), a single-side segment 306 which has active material coated on only one side of the current collector, and a tail uncoated segment 308 which is a portion of the bare current collector without coating any active material. The height of the tab 309 may be smaller than the thickness of the active materials coated on the current collector as illustrated in the cross-sectional view.

Figure 3B:
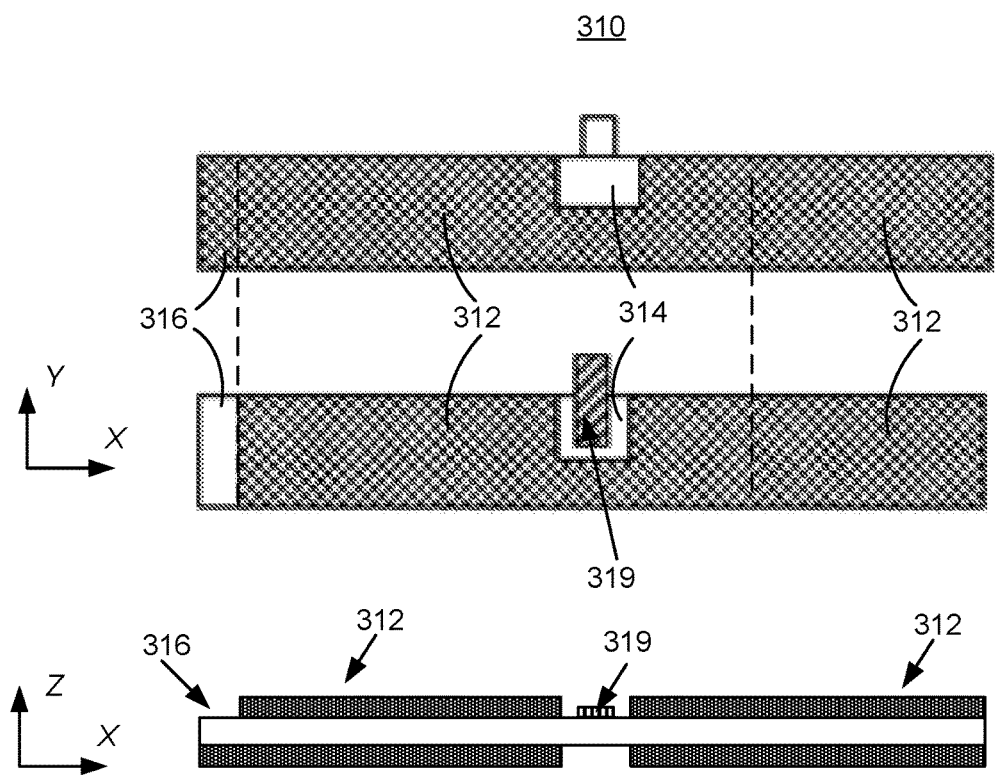
FIG. 3B includes schematic structural diagrams of two sides and a cross-sectional view of a second electrode of a battery, in accordance with some embodiments.

FIG. 3B includes schematic structural diagrams of two sides and a cross-section view of a second electrode 310 of a battery, in accordance with some embodiments. For ease of description in the current disclosure, two ends of the second electrode 310 are respectively defined as a head (e.g., the left end portion in FIG. 3B) and a tail (e.g., a right end portion in FIG. 3B) along a length direction X. In some embodiments, the second electrode 310 includes a head single-side segment 316 which have active material coated on only one side of the current collector, a double-side segment 312 which have active material coated on both sides of the current collector and extends to the tail, a tab opening area 314 that is uncoated (e.g., a portion of a bare electrode current collector), and a tab 319 attached to the tab opening area 314 (with an embedded tab structure (ETS)). The height of the tab 319 may be smaller than the thickness of the active materials coated on the current collector as illustrated in the cross-sectional view.

In some embodiments, the first electrode 300 is a cathode and the second electrode 310 is an anode. Alternatively, the first electrode 300 is an anode and the second electrode 310 is a cathode. In some embodiments, the cathode includes cathode current collector and cathode active material, and the anode include anode current collector and anode active material as discussed elsewhere herein. In some embodiments, the tabs 309 and 319 can be disposed at the middle or closer to either end of the respectively electrodes 300 and 310.

In some embodiments, the first electrode 300 or the second electrode 310 does not include a head uncoated segment, so that no uncoated segment of the current collector takes up additional volume at the center (e.g., as discussed in FIGS. 1A-1G). Further, the tabs 309 and 319 are thinner than the thickness of the active material coated on the first and second electrodes 300 and 310 respectively (e.g., as shown in the cross-sectional views in FIGS. 3A-3B), thus the tabs are not taking extra volume or space in a battery prepared by the first and second electrodes 300 and 310. Therefore, batteries prepared using the first and second electrodes 300 and 310 can have improved energy density because more active materials can contribute to the lithium ion intercalation process.

Figure 3C:
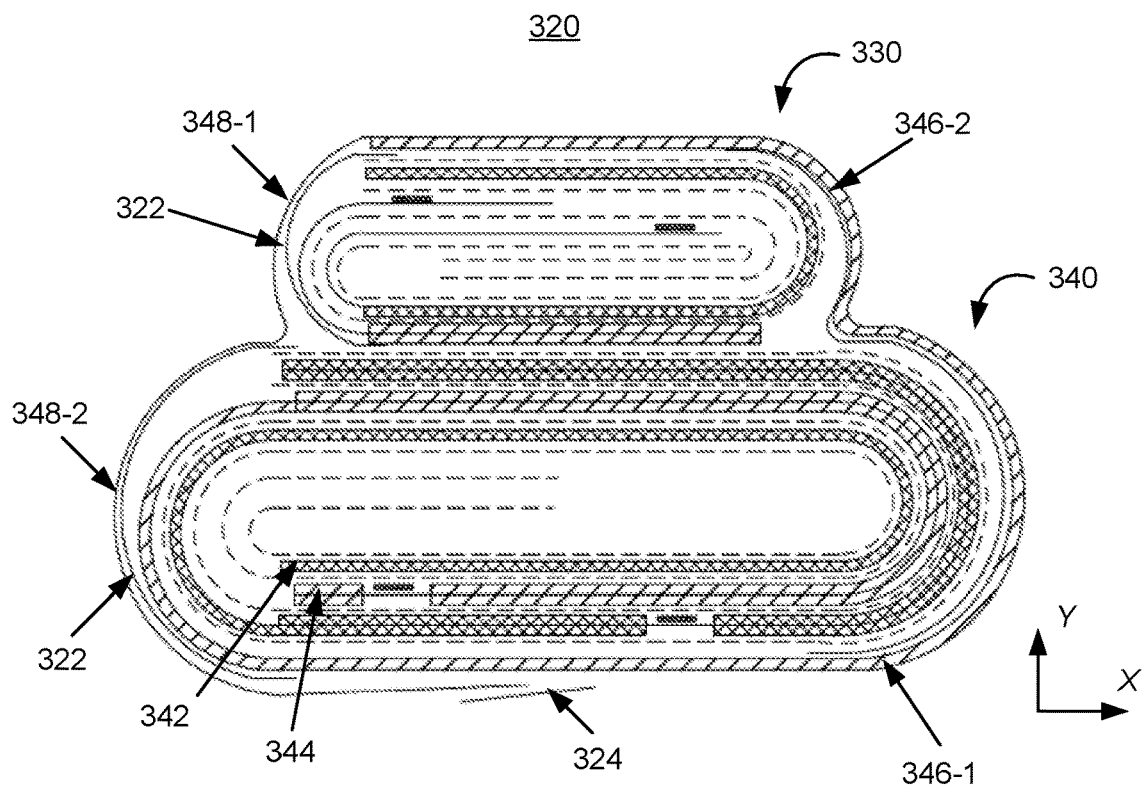
FIGS. 3C-3D are schematic structural diagrams of batteries including two electrode assemblies that are stacked to form stepped structures, in accordance with some embodiments.

FIG. 3C is a schematic structural diagram of a battery 320 including a step electrode assembly 330 stacked on a main electrode assembly 340 along a Y direction to form a stepped structure, in accordance with some embodiments. In some embodiments, the step electrode assembly 330 is shorter or narrower than the main electrode assembly 340 along a X direction.

In some embodiments, the step electrode assembly 330 has a similar structure as the electrode assembly 191 as discussed with reference to FIG. 1E. In some embodiments, the step electrode assembly 330 includes a first electrode including a head uncoated segment connected to a double-side segment disposed at the interface between the step electrode assembly 330 and the main electrode assembly 340. The step electrode assembly 330 further includes a second electrode opposite to the first electrode and including a head uncoated segment connected to a single-side segment. Both the first and second electrodes of the step electrode assembly 330 wind counterclockwise starting from a center toward outside.

In some embodiments, the main electrode assembly 340 uses the first electrode 300 and the second 310 as discussed with reference to FIGS. 3A-3B. In some embodiments, the first electrode and the second electrode start from the same position inside the electrode assembly 340 to wind counterclockwise from inside out. For example, the single-side segment 342 (e.g., the single-side segment 316, FIG. 3B) of the second electrode and the double-side segment 344 (e.g., the double-side segment 302, FIG. 3A) of the first electrode start from the same position within the electrode assembly 340 and wind counterclockwise.

In some embodiments, different from the proportions between different segments illustrated in FIGS. 3A-3B, the single-side segments 306 and the tail uncoated segment 308 of the first electrode 300 and the single-side segment 316 of the second electrode 310 are longer than the double-side segment 302 and the double-side segment 312 in respective electrodes. Ins some embodiments, the single-side segment 346 (e.g., the single-side segment 306, FIG. 3A) and the tail uncoated segment 348 (e.g., the tail uncoated segment 308, FIG. 3A) extend from the main electrode assembly 340 to disposed on an outer portion of the step electrode assembly 330. For example, the single-side segment 346 of the first electrode includes a segment 346-1 disposed on the left, bottom, and right sides of the main electrode assembly 340, and a segment 346-2 disposed on the right and top sides of the step electrode assembly 330 (the segment 346-2 participating in electrochemical reactions with the single-side segment of the second electrode in the step electrode assembly 330 to generate electrical energy). The tail uncoated segment 348 includes a segment 348-1 disposed on the left side of the step electrode assembly 330 and a segment 348-2 disposed on the left side of the main electrode assembly 340. In some embodiments at the interface between the step electrode assembly 330 and the main electrode assembly 340, the double-side segment of the first electrode from the step electrode assembly 330 is facing the double-side segment of the second electrode from the main electrode assembly 340 to participate in the electrochemical reactions between the two opposing electrodes to generate electrical energy.

In some embodiments, the first electrode from the step electrode assembly or the main electrode assembly can be a cathode or an anode, while the second electrode being an anode or a cathode that is opposite to the first electrode. In some embodiments, the battery 320 further includes separators (dashed lines) disposed between the opposing electrodes (e.g., the first electrode and the second electrode, or the cathode and the anode). In some embodiments, the battery 320 further includes a tail adhesive 324 to seal the end of the tail uncoated segment on the main electrode assembly 340, and protective adhesives 322 to prevent precipitation and/or exposure of lithium from the battery 320.

Figure 3D:
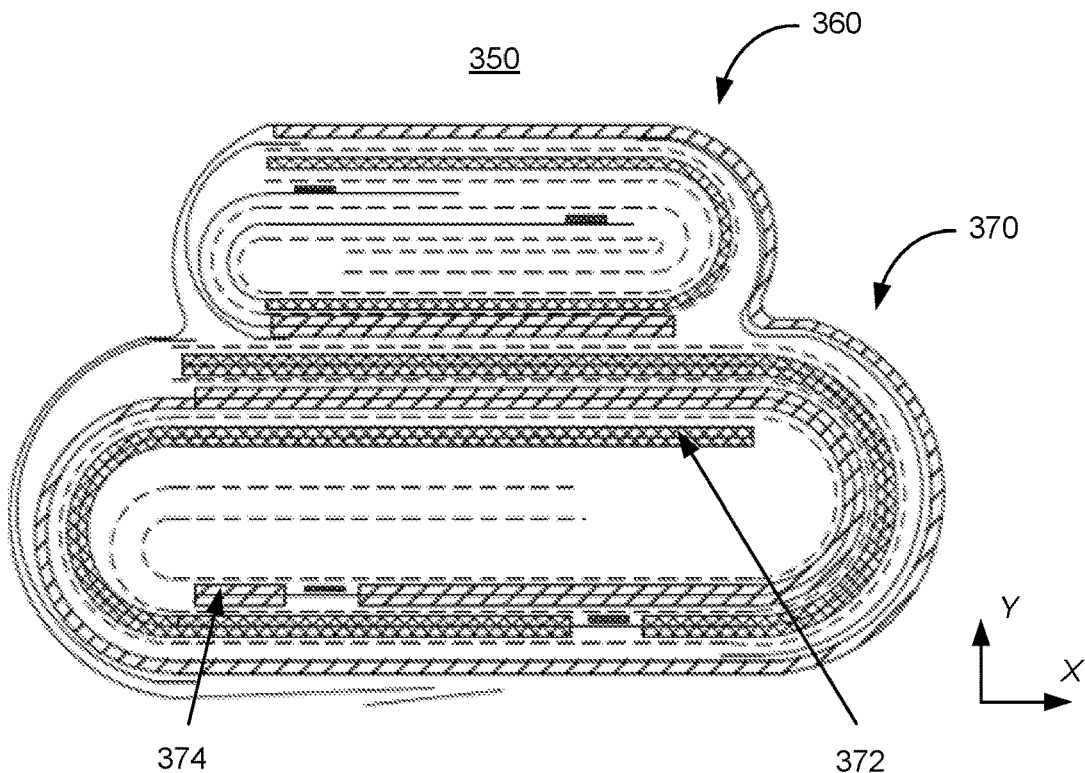

FIG. 3D is a schematic structural diagram of a battery 350 including a step electrode assembly 350 stacked on a main electrode assembly 360 along a Y direction to form a stepped structure, in accordance with some embodiments. In some embodiments, the step electrode assembly 350, the main electrode assembly 360, and the shared segments of the first electrode from the main electrode assembly 360 to the step electrode assembly 350 are substantially the same as the step electrode assembly 330, the main electrode assembly 340, the shared segments 346 and 348 of the first electrode from the main electrode assembly 330 to the step electrode assembly 340 as discussed with reference to FIG. 3C. The main difference between the battery 320 in FIG. 3C and the battery 350 in FIG. 3D is that, the first electrode and the second electrode start from different (e.g., opposite) locations. For example, the double-side segment 374 of the first electrode starts from the bottom left within the electrode assembly 340, and the double-side segment 372 (alternatively could be single-side) of the second electrode starts from the top right of within the electrode assembly 340 and wind counterclockwise. In some embodiments, separators are also shared between the step and main electrode assemblies.

Figure 4A:
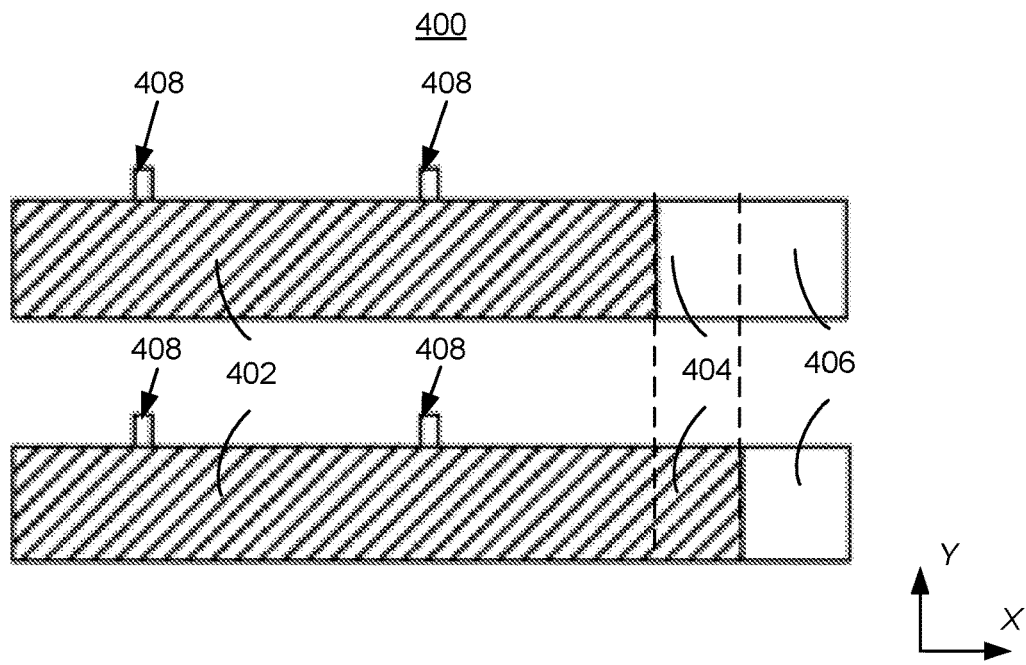
FIG. 4A includes schematic structural diagrams of two sides of a first electrode of a battery, in accordance with some embodiments.

FIG. 4A includes schematic structural diagrams of two sides (e.g., surfaces) of a first electrode 400 of a battery, in accordance with some embodiments. In some embodiments, the first electrode 400 includes a head (e.g., left end portion) double-side segment 402 with active material coated on both sides of the current collector, a single-side segment 404 with active material coated on one surface of the current collector, and a tail (e.g., the right end portion) uncoated segment 406 (e.g., a portion of the bare current collector), and a plurality of electrode tabs 408 which are connected to the current collector. The electrode tabs 408 may be preserved from a metal sheet when cutting the current elector of the first electrode 400 from the metal sheet.

Figure 4B:
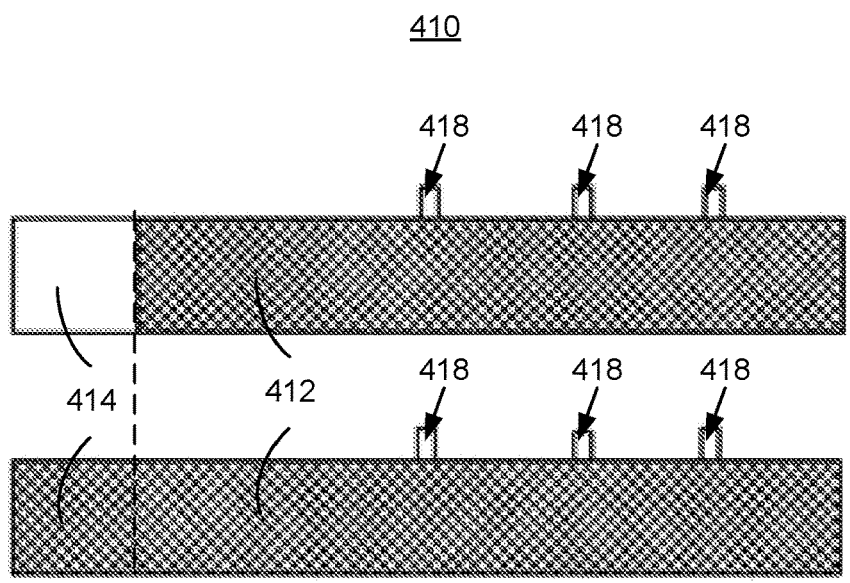
FIG. 4B includes schematic structural diagrams of two sides of a second electrode of a battery, in accordance with some embodiments.

FIG. 4B includes schematic structural diagrams of two sides (e.g., surfaces) of a second electrode 410 of a battery, in accordance with some embodiments. In some embodiments, the second electrode 410 includes a head (e.g., left end portion) single-side segment 414 with active material coated on one surface of the current collector, a double-side segment 412 with active material coated on both surfaces of the current collector, and a plurality of electrode tabs 418 which are connected to the current collector. The electrode tabs 418 may be preserved from a metal sheet when cutting the current elector of the second electrode 410 from the metal sheet.

In some embodiments, the first electrode 400 is a cathode and the second electrode 410 is an anode. Alternatively, the first electrode 400 is an anode and the second electrode 410 is a cathode. In some embodiments, the cathode includes cathode current collector and cathode active material, and the anode include anode current collector and anode active material as discussed elsewhere herein. In some embodiments, the number of tabs on each electrode can be determined by the number of layers in the electrode assembly. For example, there are one tab every layer or every other layer. The positions and the distances between the tabs on the electrode can be adjusted to change the location and number of tabs in the battery. In some embodiments, using multiple tabs on an electrode can increase the power density of the battery. That is, the battery is capable of fast discharging at a high current rate.

Figure 4C:
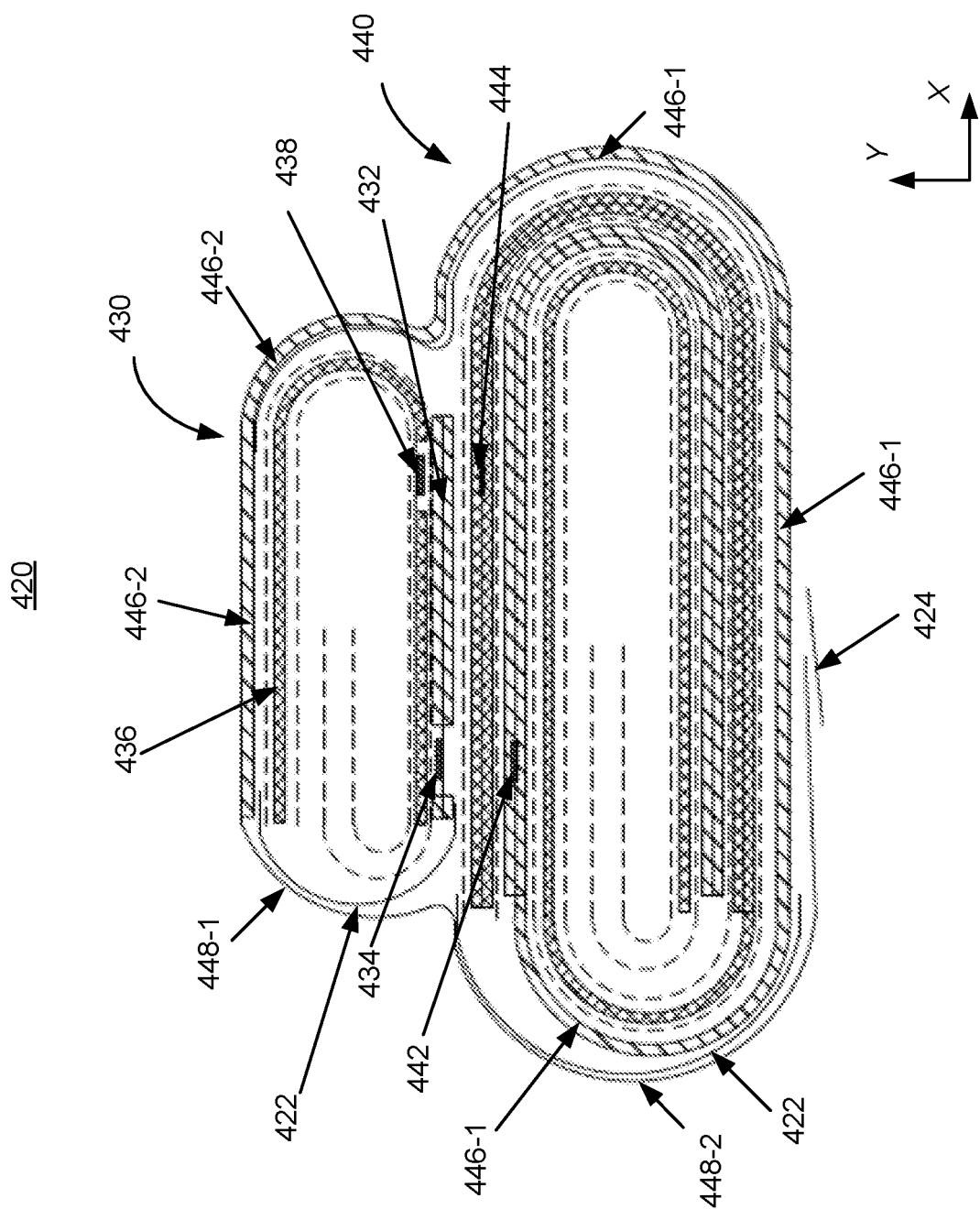
FIG. 4C is a schematic structural diagram of a battery including two electrode assemblies that are stacked to form a stepped structure, in accordance with some embodiments.

FIG. 4C is a schematic structural diagram of a battery 420 including a step electrode assembly 430 stacked on a main electrode assembly 440 along a Y direction to form a stepped structure, in accordance with some embodiments. In some embodiments, the step electrode assembly 430 is shorter or narrower than the main electrode assembly 440 along a X direction.

In some embodiments, the first electrode and the second electrode of the step electrode assembly 430 uses embedded tab structures (ETS) as discussed with reference to FIGS. 3A-3B. For example, the first electrode 432 is double-sided with active materials coated on both surfaces of the current collector. A tab 434 is embedded in the first electrode 432 as discussed in FIG. 3A. The second electrode 436 is single-sided, and a tab 438 is embedded on the coated surface of the second electrode 436.

In some embodiments, the main electrode assembly 440 uses the first electrode 400 and the second electrode 410 as discussed in FIGS. 4A-4B. In particular, each of the first and second electrodes includes one or more tabs that are parts of the current collector as discussed with reference to FIGS. 4A-4B.

In some embodiments, the first electrode of the main electrode assembly 440 includes a single-side segment 446-1 disposed on the left, bottom, and right sides of the main electrode assembly 340, and a single-side segment 446-2 disposed on the right and top sides of the step electrode assembly 330. The single-side segment 446-2 participates in electrochemical reactions with the single-side segment of the second electrode in the step electrode assembly 430 to generate electrical energy. In some embodiments, the first electrode of the main electrode assembly 440 further includes an uncoated segment (e.g., a portion of a bare current collector) 448-1 disposed on the left side of the step electrode assembly 430 and an uncoated segment 448-2 disposed on the left side of the main electrode assembly 440. The first electrode can be a cathode or an anode, and the second electrode is opposite to the first electrode. In some embodiments at the interface between the step electrode assembly 430 and the main electrode assembly 440, the first electrode from the step electrode assembly 430 is facing the second electrode from the main electrode assembly 440 to participate in the electrochemical reactions between the two opposing electrodes to generate electrical energy.

In some embodiments, the battery 420 further includes separators (dashed lines) disposed between the opposing electrodes (e.g., the first electrode and the second electrode, or the cathode and the anode). In some embodiments, the battery 420 further includes a tail adhesive 424 to seal the end of the tail uncoated segment on the main electrode assembly 440, and protective adhesives 422 to prevent precipitation and/or exposure of lithium from the battery 420.

FIGS. 5A-5K are schematic structural diagrams of various stepped batteries having electrode segments from the step cells (also "step electrode assemblies") to be shared with the main cells (also "main electrode assemblies"), in accordance with some embodiments. In some embodiments, each battery as illustrated in FIGS. 5A-5K includes a step electrode assembly stacked on a main electrode assembly to form a stepped structure. The step electrode assembly is shorter or narrower than the main electrode assembly. In some embodiments, each electrode assembly ("cell") includes a first electrode and a second electrode as two opposing electrodes of a battery. In some embodiments, the first electrode is a cathode, and the second electrode is an anode. Alternatively, the first electrode is anode, and the second electrode is a cathode of the battery. The materials and process used for preparing the cathode and the anode are discussed in various embodiments elsewhere in the present disclosure. Each battery from FIGS. 5A-5K may further include separators (dashed lines) disposed between the opposing electrodes (e.g., the first electrode and the second electrode, or the cathode and the anode). Each battery may also include a tail adhesive to seal the end of the tail uncoated segment onto an electrode assembly (e.g., the top of the step cell), and protective adhesives to prevent precipitation and/or exposure of lithium from the battery. In some embodiments, separators are also shared between the step and main electrode assemblies.

Figure 5A:
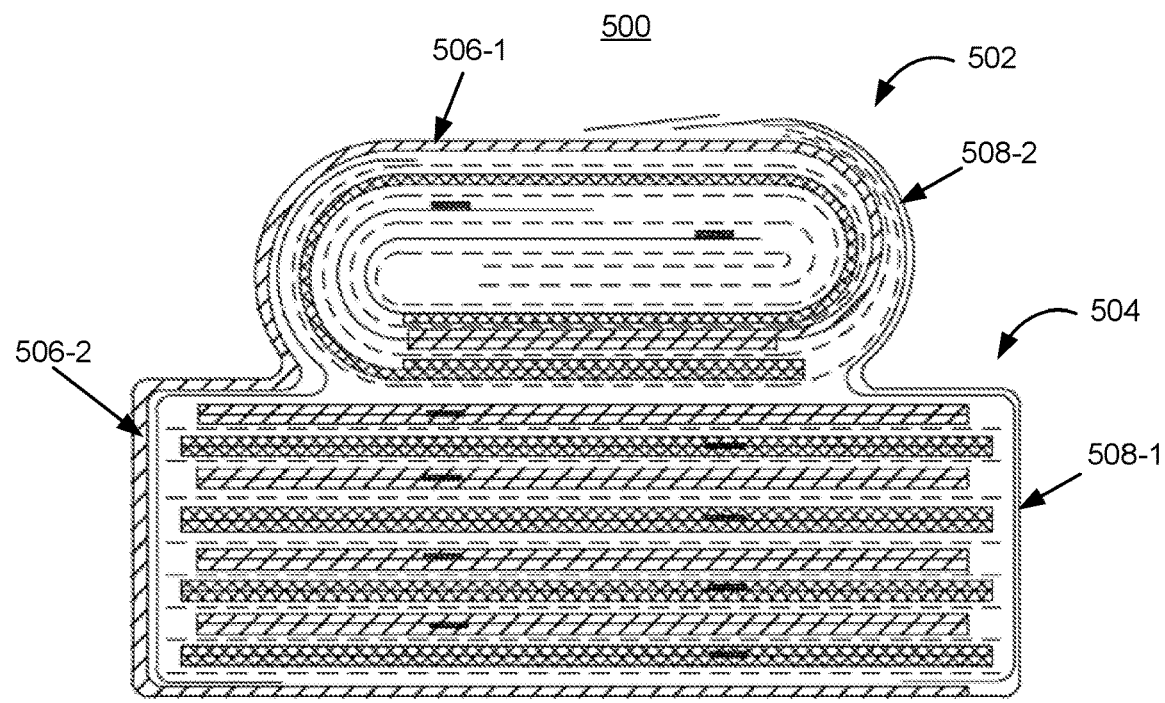
FIGS. 5A-5K are schematic structural diagrams of stepped batteries having electrode segments from the step cells to be shared with the main cells, in accordance with some embodiments.

For each battery as shown in FIGS. 5A-5K, in some embodiments, the first electrode from the step cell includes a first segment (e.g., the single-side segment 506-1 of the step cell 502, FIG. 5A) disposed on the top and left sides of the step cell, and a second segment (e.g., the single-side segment 506-2 of the main electrode assembly 504, FIG. 5A) disposed on an outer portion, such as left and bottom sides of the main cell. In some embodiments, the second segment of the first electrode from the step cell participates in electrochemical reactions with the second electrode of the main cell to generate electrical energy. The first electrode from the step cell further includes a first uncoated segment (e.g., a portion of a bare current collector, such as the uncoated segment 508-1) disposed on the outer right side of the main cell, and a second uncoated segment (e.g., the uncoated segment 508-2) disposed on the outer right side of the step cell. In some embodiments, at the interface between the step cell and the main cell, the second electrode from the step cell is facing the first electrode from the main cell to participate in the electrochemical reactions between these two opposing electrodes to generate electrical energy.

FIG. 5A shows a stepped battery 500 including a step cell 502 having a similar structure as the step electrode assembly 171 as discussed with reference to FIG. 1D, and a main cell 504 having a similar structure as the stacking electrode assembly 270 as discussed with reference to 2D.

Figure 5B:
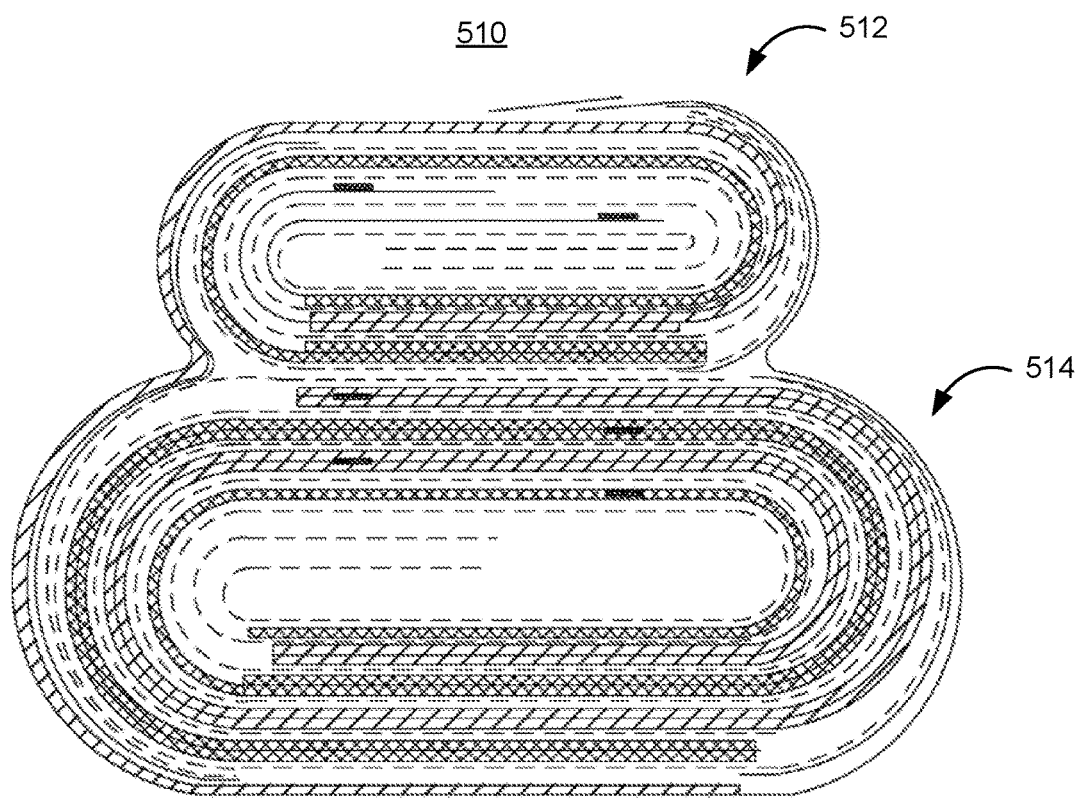

FIG. 5B illustrates a stepped battery 510 including a step cell 512 with a similar structure as the step electrode assembly 171 as discussed with reference to FIG. 1D, and a main cell 514 with a similar structure as the main electrode assembly 440 as discussed with reference to FIG. 4C.

Figure 5C:
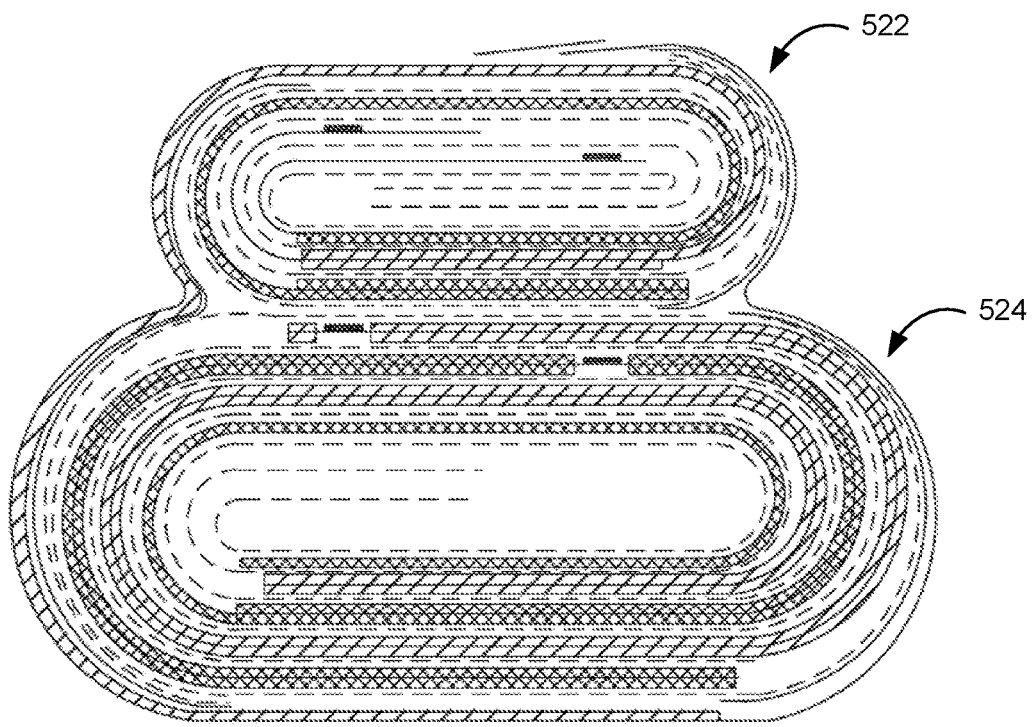

FIG. 5C illustrates a stepped battery 520 including a step cell 522 with a similar structure as the step electrode assembly 171 as discussed with reference to FIG. 1D, and a main cell 524 with a similar structure as the main electrode assembly 440 as discussed with reference to FIG. 4C.

Figure 5D:
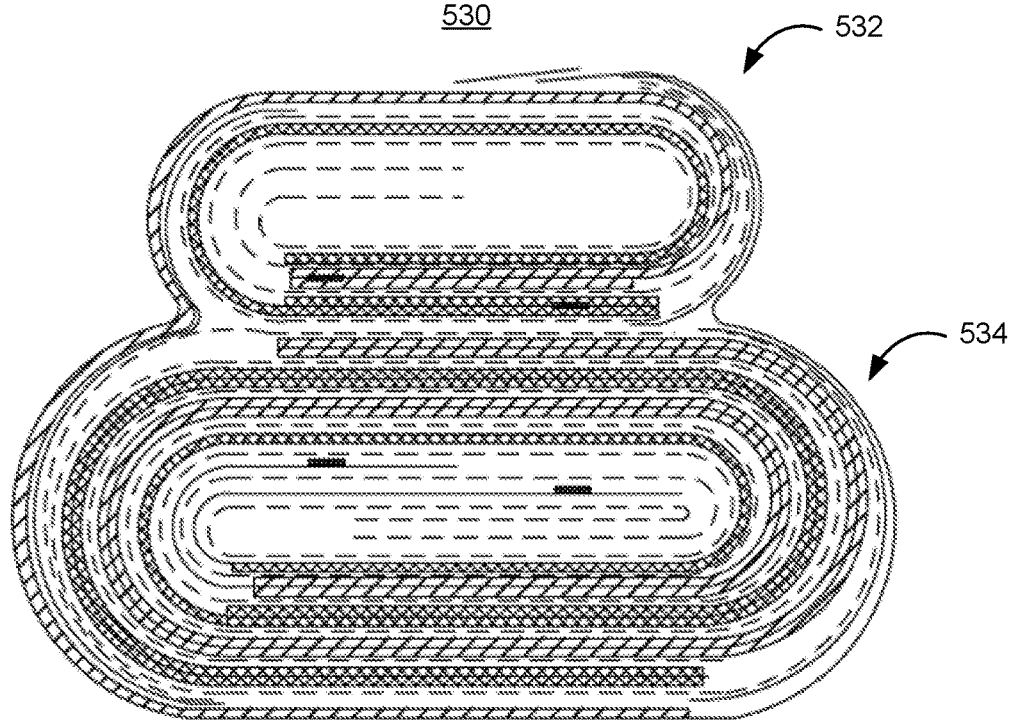

FIG. 5D illustrates a stepped battery 530 including a step cell 532 with a similar structure as the main electrode assembly 440 and the first and second electrodes 400 and 410 as discussed with reference to FIGS. 4A-4C, and a main cell 534 with a similar structure as the main electrode assembly 181 as discussed with reference to FIG. 1D.

Figure 5E:
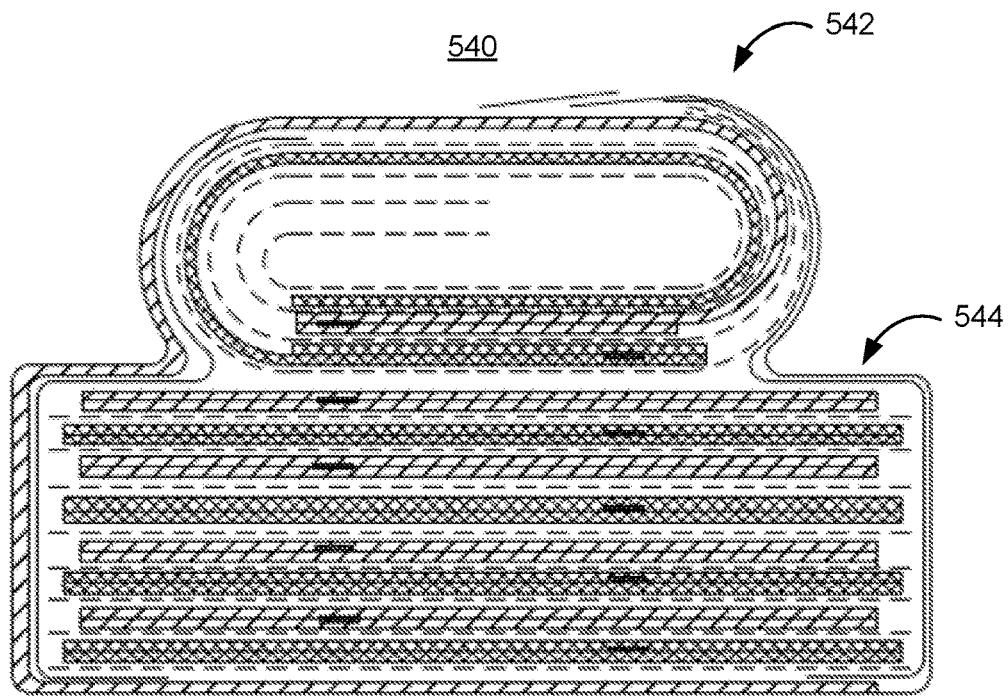

FIG. 5E illustrates a stepped battery 540 including a step cell 542 with a similar structure as the main electrode assembly 440 and the first and second electrodes 400 and 410 as discussed with reference to FIGS. 4A-4C, and a main cell 544 with a similar structure as the main electrode assembly 270 as discussed with reference to FIG. 2D.

Figure 5F:
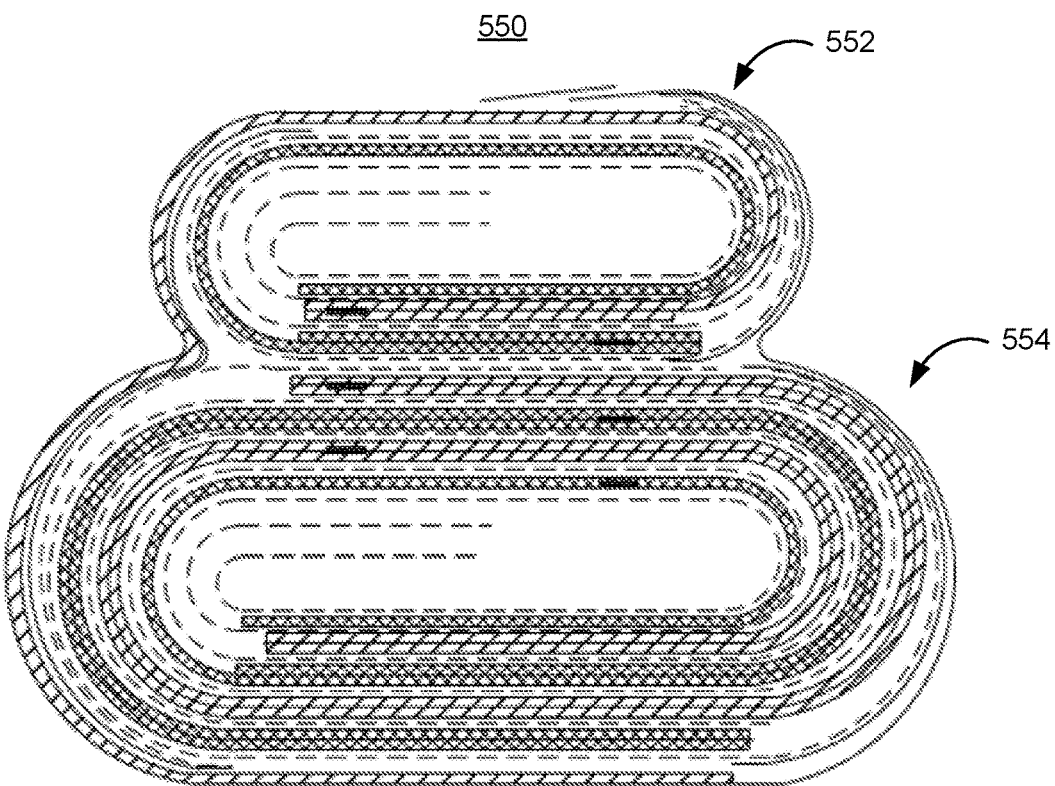

FIG. 5F illustrates a stepped battery 550 including a step cell 552 with a similar structure as the main electrode assembly 440 and the first and second electrodes 400 and 410 as discussed with reference to FIGS. 4A-4C, and a main cell 554 with a similar structure as the main electrode assembly 440 and the first and second electrodes 400 and 410 as discussed with reference to FIGS. 4A-4C.

Figure 5G:
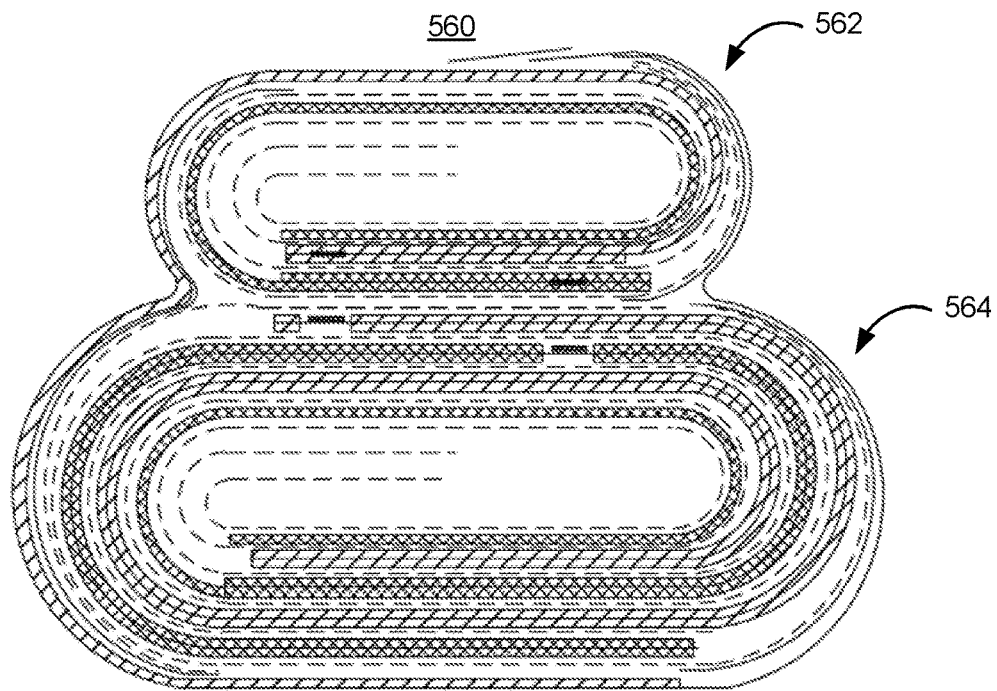

FIG. 5G illustrates a stepped battery 560 including a step cell 562 with a similar structure as the electrode assembly 440 and the first and second electrodes 400 and 410 as discussed with reference to FIGS. 4A-4C, and a main cell 564 with a similar structure as the electrode assembly 340 and first and second electrodes 300 and 310 as discussed with reference to FIGS. 3A-3C.

Figure 5H:
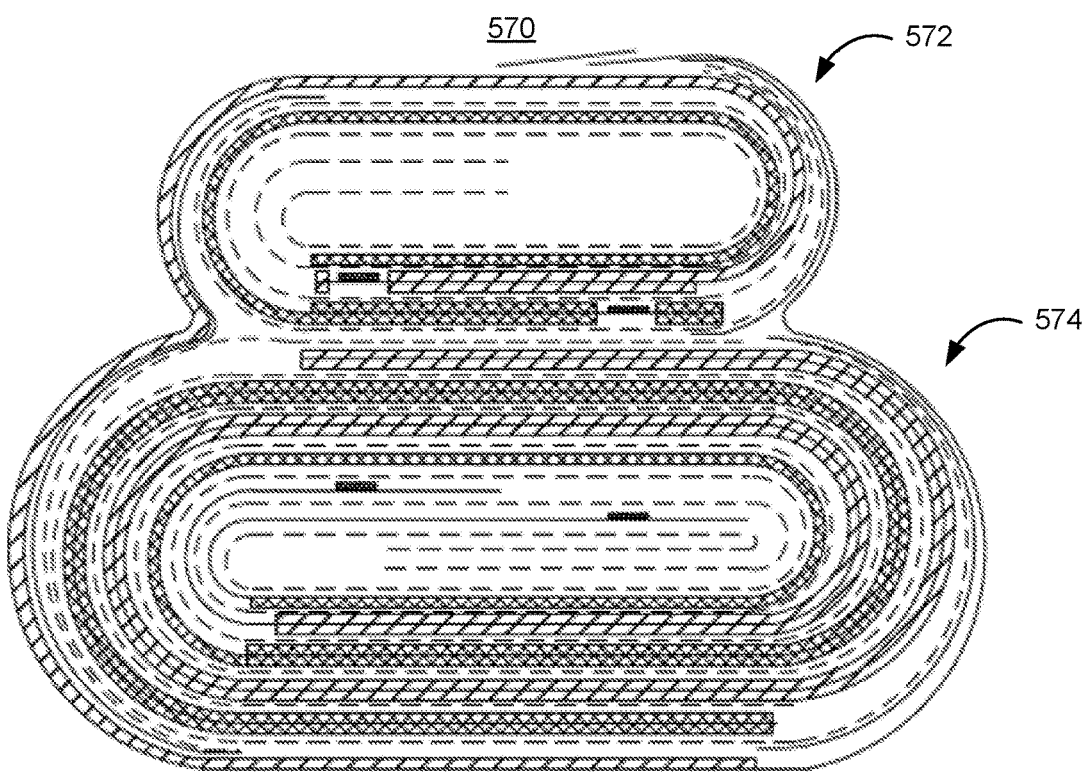

FIG. 5H illustrates a stepped battery 570 including a step cell 572 with a similar structure as the electrode assembly 370 and the first and second electrodes 300 and 310 as discussed with reference to FIGS. 3A-3B and 3D, and a main cell 554 with a similar structure as the main electrode assembly 181 as discussed with reference to FIG. 1D.

Figure 5I:
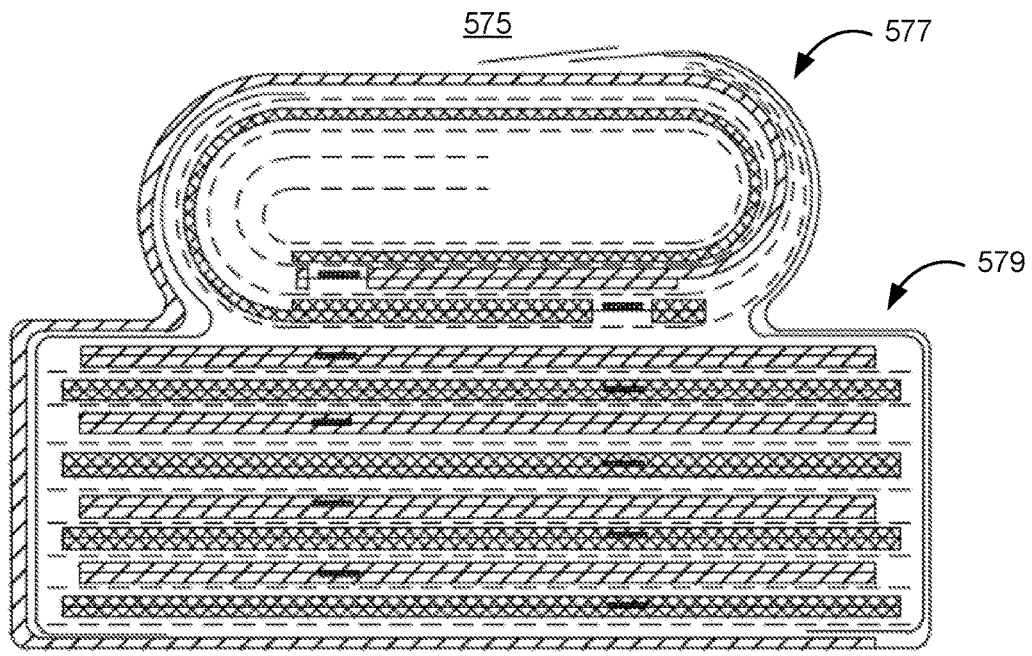

FIG. 5I illustrates a stepped battery 575 including a step cell 577 with a similar structure as the electrode assembly 370 and the first and second electrodes 300 and 310 as discussed with reference to FIGS. 3A-3B and 3D, and a main cell 554 with a similar structure as the stacking electrode assembly 270 as discussed with reference to 2D.

Figure 5J:
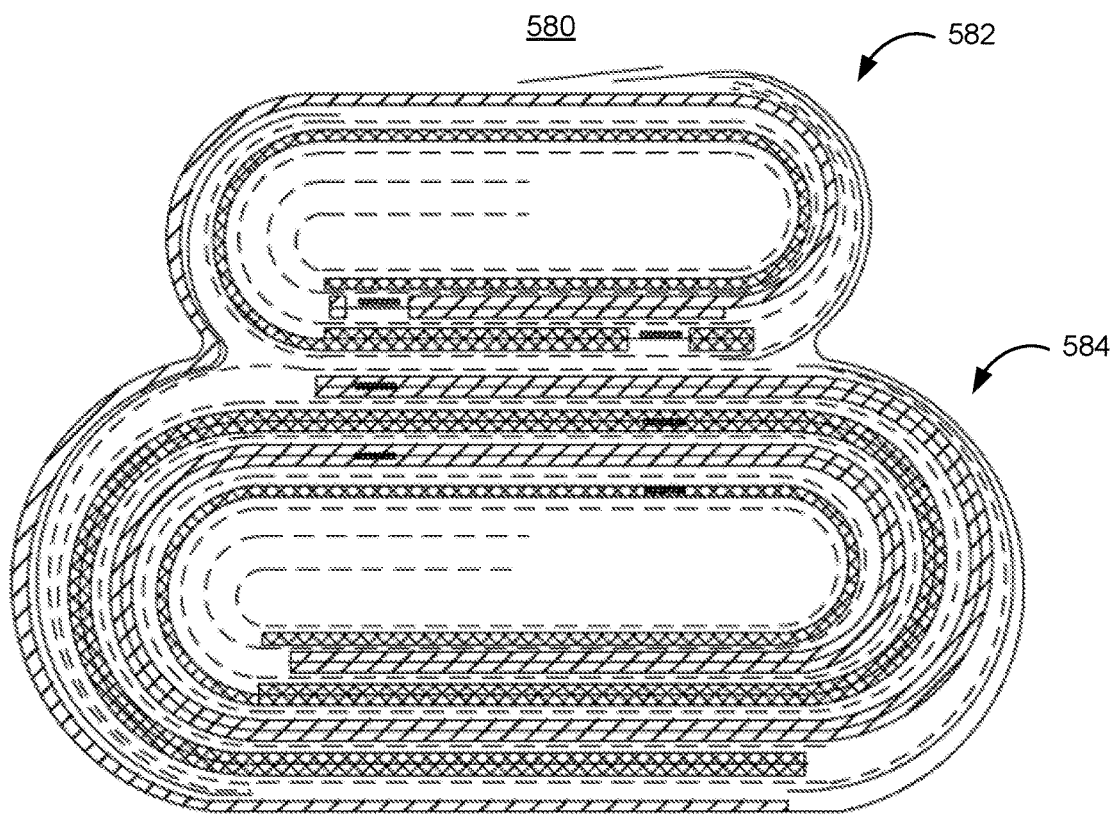

FIG. 5J illustrates a stepped battery 580 including a step cell 582 with a similar structure as the electrode assembly 370 and the first and second electrodes 300 and 310 as discussed with reference to FIGS. 3A-3B and 3D, and a main cell 584 with a similar structure as the main electrode assembly 440 and the first and second electrodes 400 and 410 as discussed with reference to FIGS. 4A-4C.

Figure 5K:
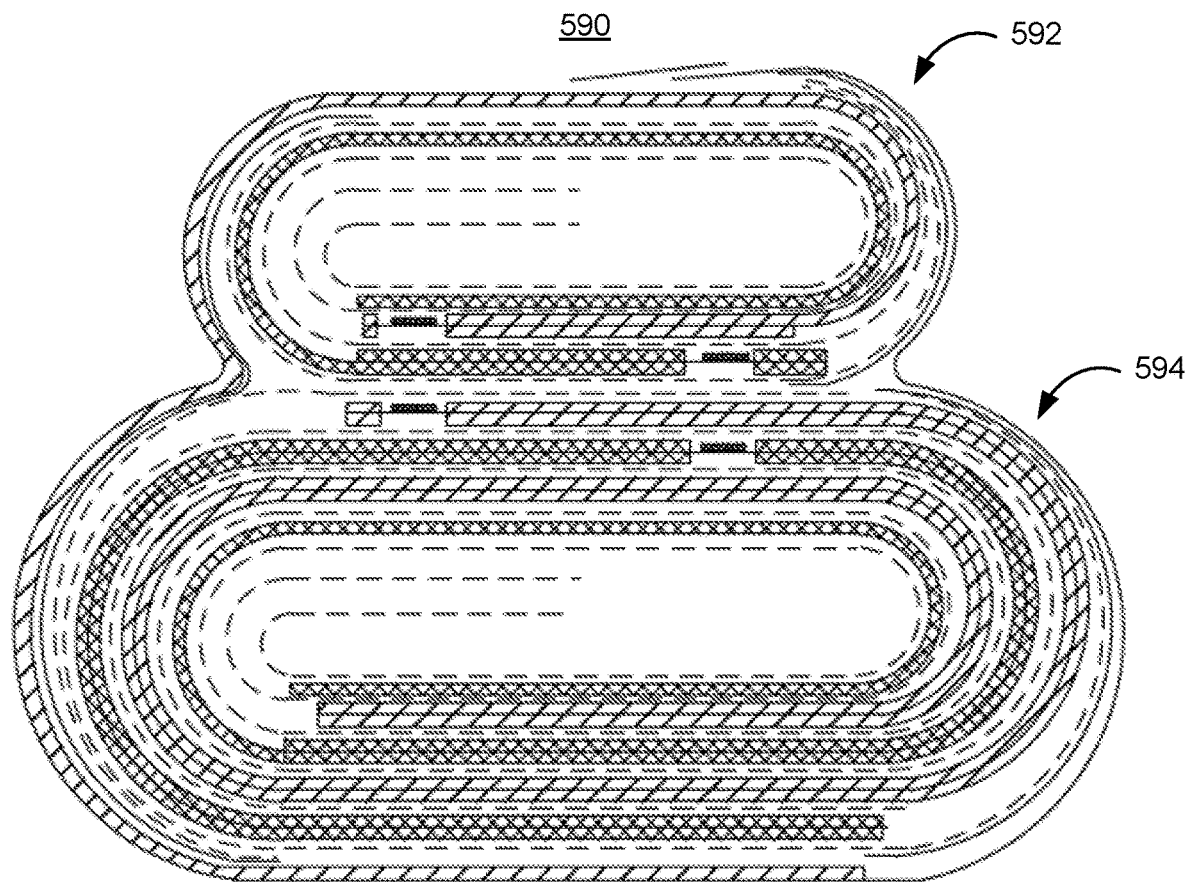

FIG. 5K illustrates a stepped battery 590 including a step cell 592 with a similar structure as the electrode assembly 370 and the first and second electrodes 300 and 310 as discussed with reference to FIGS. 3A-3B and 3D, and a main cell 594 with a similar structure as the electrode assembly 340 and first and second electrodes 300 and 310 as discussed with reference to FIGS. 3A-3C.

Figure 6A:
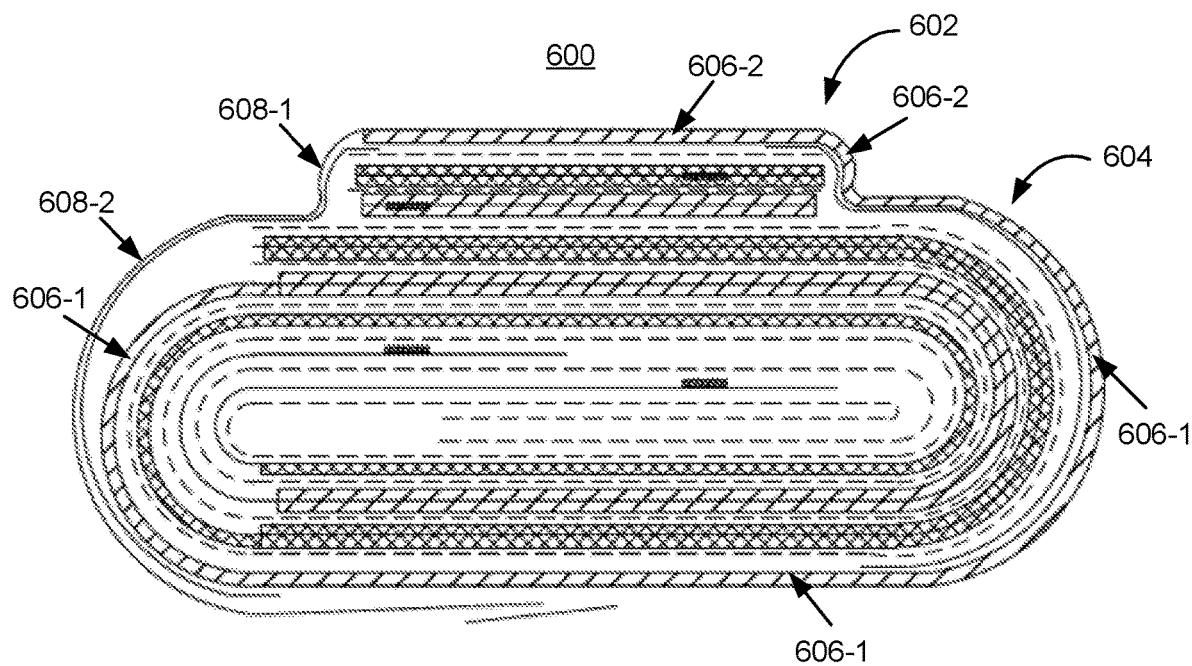
FIGS. 6A-6K are schematic structural diagrams of stepped batteries having electrode segments from the main cells to be shared with the step cells, in accordance with some embodiments.
Figure 6B:
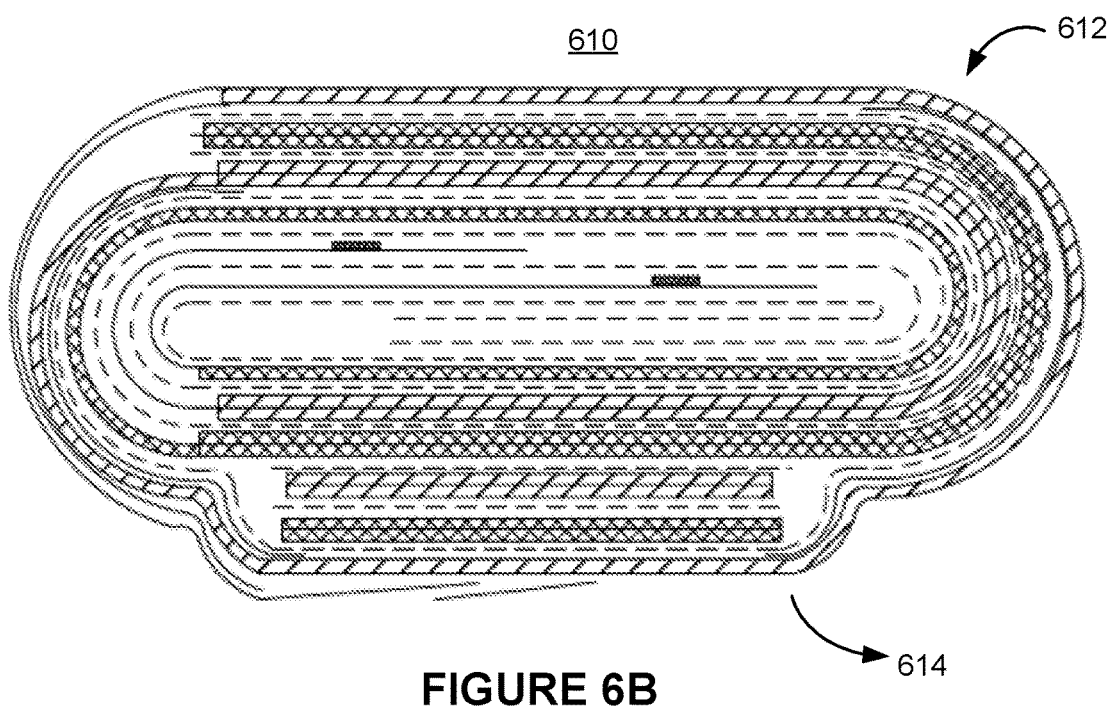
Figure 6C:
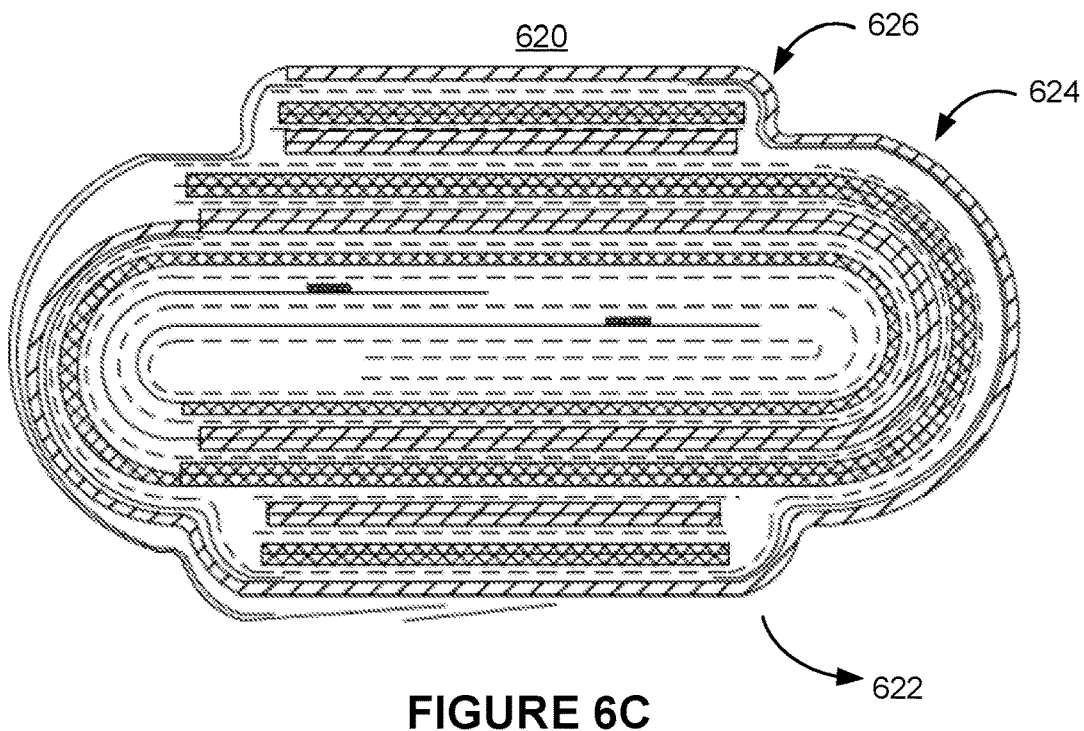

FIGS. 6A-6L are schematic structural diagrams of various stepped batteries having electrode segments from the main cells (also "main electrode assemblies") to be shared with the step cells (also "step electrode assemblies"), in accordance with some embodiments. In some embodiments, each battery as illustrated in FIGS. 6A and 6D-6L includes a step electrode assembly stacked on a main electrode assembly to form a stepped structure. The step electrode assembly is shorter or narrower than the main electrode assembly. In some embodiments, a battery 610 as illustrated in FIG. 6B includes a main electrode assembly 612 stacked on a step electrode assembly 614 to form an inverted stepped structure. In some embodiments, a battery 620 as illustrated in FIG. 6C includes a first step electrode assembly 622, a main electrode assembly 624 stacked on the first step electrode assembly 622, and a second step electrode assembly 626 stacked on the main electrode assembly 624 to form a stepped structure. In some embodiments, separators are also shared between the step and main electrode assemblies.

In some embodiments, each electrode assembly ("cell") includes a first electrode and a second electrode as two opposing electrodes of a battery. In some embodiments, the first electrode is a cathode, and the second electrode is an anode. Alternatively, the first electrode is anode, and the second electrode is a cathode of the battery. The materials and process used for preparing the cathode and the anode are discussed in various embodiments elsewhere in the present disclosure. Each battery from FIGS. 6A-6L may further include separators (dashed lines) disposed between the opposing electrodes (e.g., the first electrode and the second electrode, or the cathode and the anode). Each battery may also include a tail adhesive to seal the end of the tail uncoated segment onto an electrode assembly (e.g., the bottom of the main cell of the batteries in FIGS. 6A and 6D-6L), and protective adhesives to prevent precipitation and/or exposure of lithium from the battery.

For each battery as shown in FIGS. 6A and 6D-6L, the step cell and the main cell share one or more segments of the first electrode from the main electrode assembly, which are similar to the battery 190 as discussed with reference to FIG. 1E. In some embodiments, the first electrode from the main cell includes a first segment (e.g., the single-side segment 606-1 of the main cell 604, FIG. 6A) disposed on the left, bottom, and right sides of the main cell, and a second segment (e.g., the single-side segment 606-2 of the main cell 604, FIG. 6A) disposed on an outer portion, such as right and top sides of the step cell. In some embodiments, the second segment of the first electrode from the main cell participates in electrochemical reactions with the second electrode of the step cell to generate electrical energy. The first electrode from the main cell further includes a first uncoated segment (e.g., a portion of a bare current collector, such as the uncoated segment 608-1) disposed on the outer left side of the step cell, and a second uncoated segment (e.g., the uncoated segment 608-2) disposed on the outer left side of the main cell. In some embodiments, at the interface between the step cell and the main cell, the first electrode of the step cell is facing the second electrode of the main cell to participate in the electrochemical reactions between these two opposing electrodes to generate electrical energy. In some embodiments, separators are also shared between the step and main electrode assemblies.

FIG. 6A shows a stepped battery 600 including a step cell 602 having a similar structure as the stacking electrode assembly 250 as discussed with reference to FIG. 2D, and a main cell 604 having a similar structure as the main electrode assembly 192 as discussed with reference to 1E.

FIG. 6B shows an inverted stepped battery 610 including a main cell 612 having a similar structure as the main electrode assemblies 151 and 161 as discussed with reference to FIGS. 1F and 1G, and a step cell 614 having a structure of a stacking cell by stacking the first and second electrodes and the separator as discussed with reference to FIGS. 2A-2D. Similar to the main electrode assembly 151 or 161, the first electrode from the main cell includes single-side segments and uncoated segments that are shared by and disposed on both the main cell and the step cell to increase the areas participating in the electrochemical reactions and to improve the mechanical integrity of the battery 610.

FIG. 6C shows an inverted stepped battery 620 including a step cell 626 disposed on a main cell 624, and the main cell 624 further disposed on a step cell 622. In some embodiments, the step cell 626 and the step cell 622 each includes a similar structure as the stacking electrode assembly 250 as discussed with reference to FIG. 2D. The main cell 624 includes a similar structure as the main cell 192 as discussed with reference to FIG. 1E. In some embodiments, the first electrode from the main cell includes single-side segments and uncoated segments that are shared by and disposed on the main cell 624, the step cell 622, and the step cell 626 to increase the areas participating in the electrochemical reactions and to improve the mechanical integrity of the battery 620.

Figure 6D:
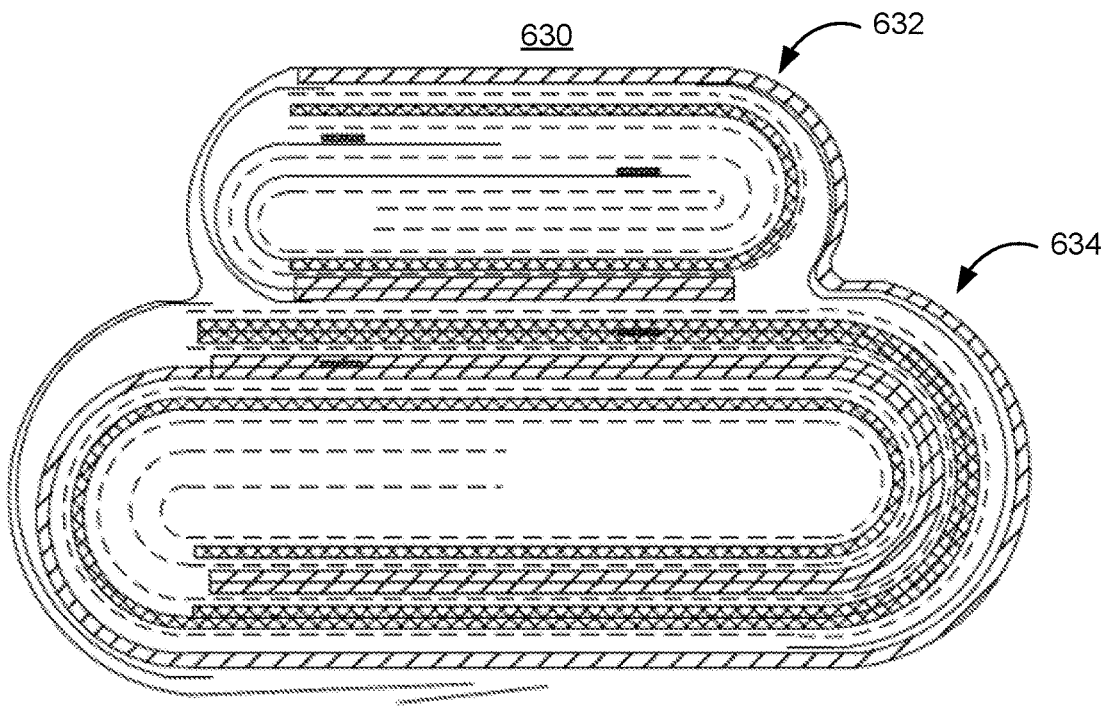

FIG. 6D shows a stepped battery 630 including a step cell 632 having a similar structure as the step electrode assembly 191 as discussed with reference to FIG. 1E, and a main cell 634 having a similar structure as the main electrode assembly 440 as discussed with reference to 4C.

Figure 6E:
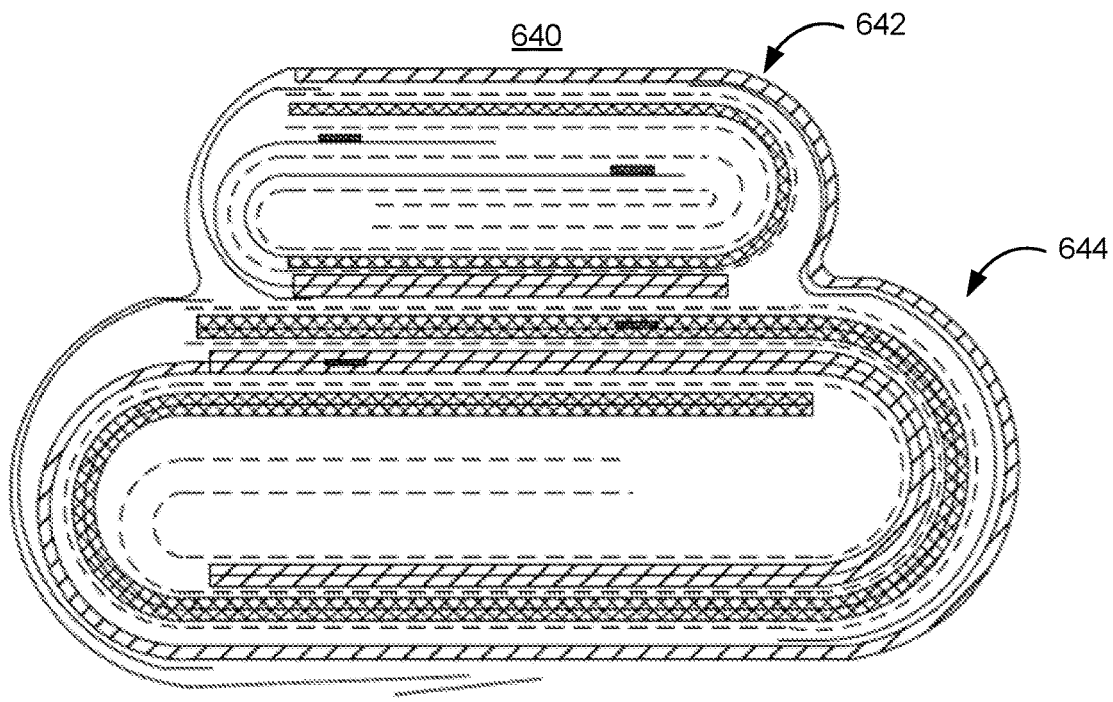

FIG. 6E shows a stepped battery 640 including a step cell 642 having a similar structure as the step electrode assembly 191 as discussed with reference to FIG. 1E, and a main cell 644 having a similar structure as the main electrode assembly 440 as discussed with reference to 4C. In some embodiments, the first electrode and the second electrode of the main cell 634 in FIG. 6D start winding at the same location, whereas the first electrode and the second electrode of the main cell 644 in FIG. 6E start from different (opposite) locations.

Figure 6F:
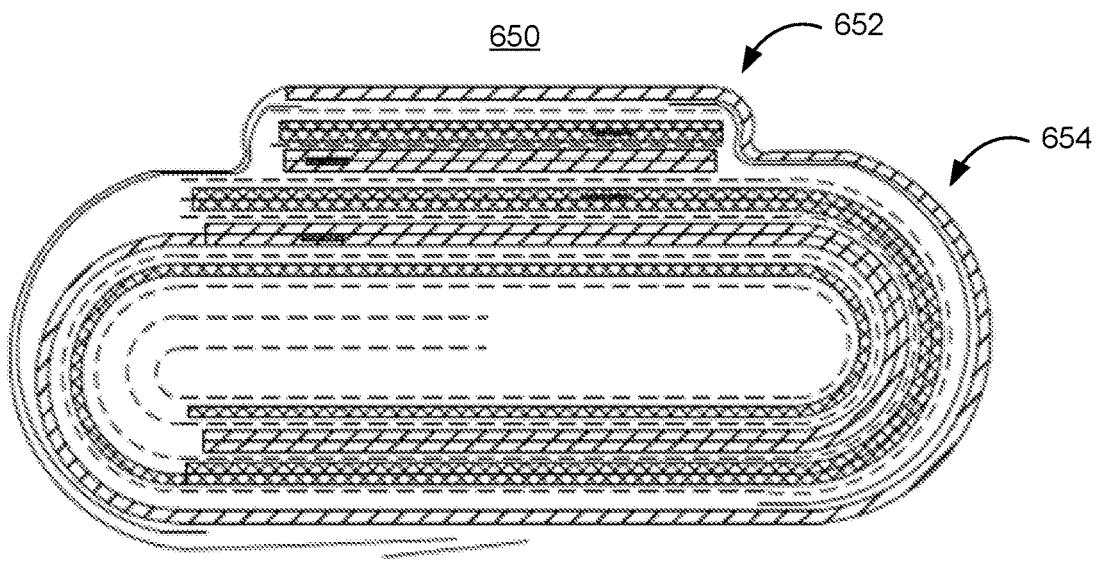

FIG. 6F shows a stepped battery 650 including a step cell 652 having a similar structure as the stacking electrode assembly 250 as discussed with reference to FIG. 2D, and a main cell 654 having a similar structure as the stacking electrode assembly 440 as discussed with reference to 4C.

Figure 6G:
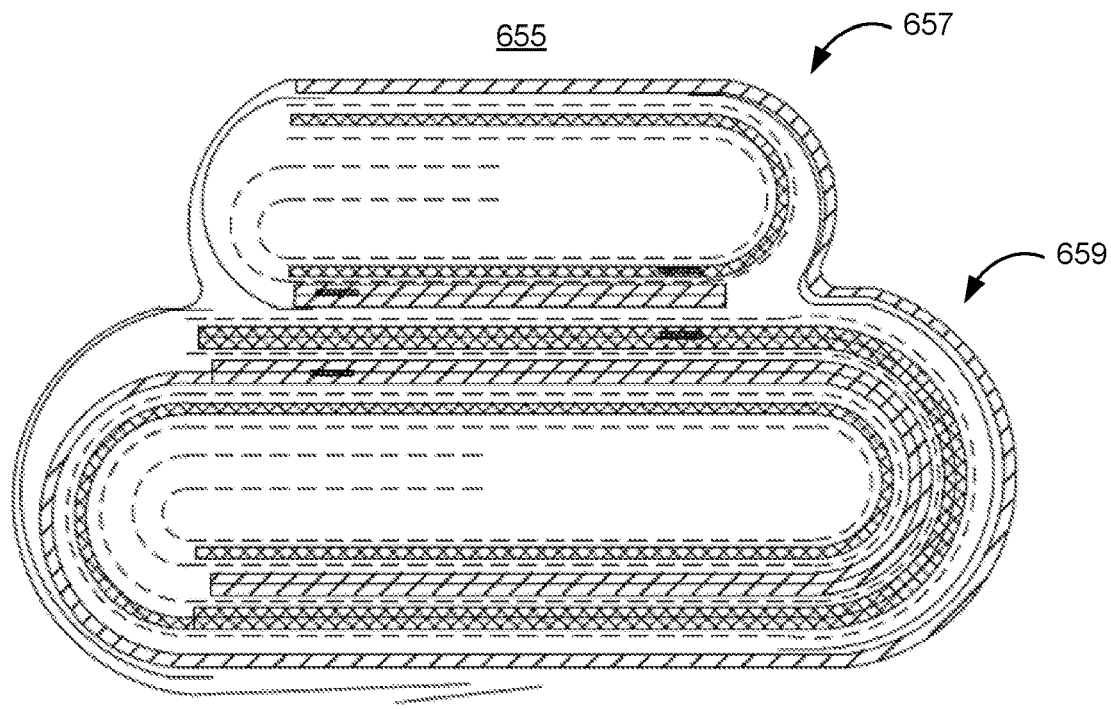

FIG. 6G shows a stepped battery 655 including a step cell 657 having a similar structure as the main electrode assembly 440 and the first and second electrodes 400 and 410 as discussed with reference to FIGS. 4A-4C, and a main cell 659 having a similar structure as the stacking electrode assembly 440 as discussed with reference to 4C.

Figure 6H:
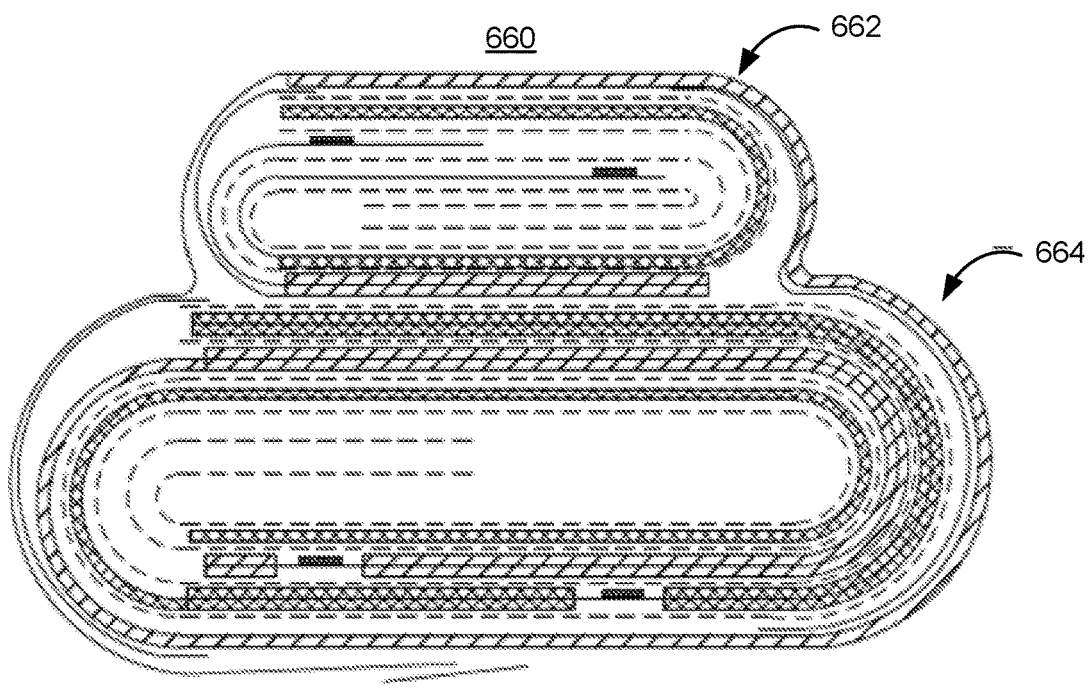

FIG. 6H shows a stepped battery 660 including a step cell 662 having a similar structure as the step electrode assembly 191 as discussed with reference to FIG. 1E, and a main cell 664 having a similar structure as the main electrode assembly 340 as discussed with reference to 3C.

Figure 6I:
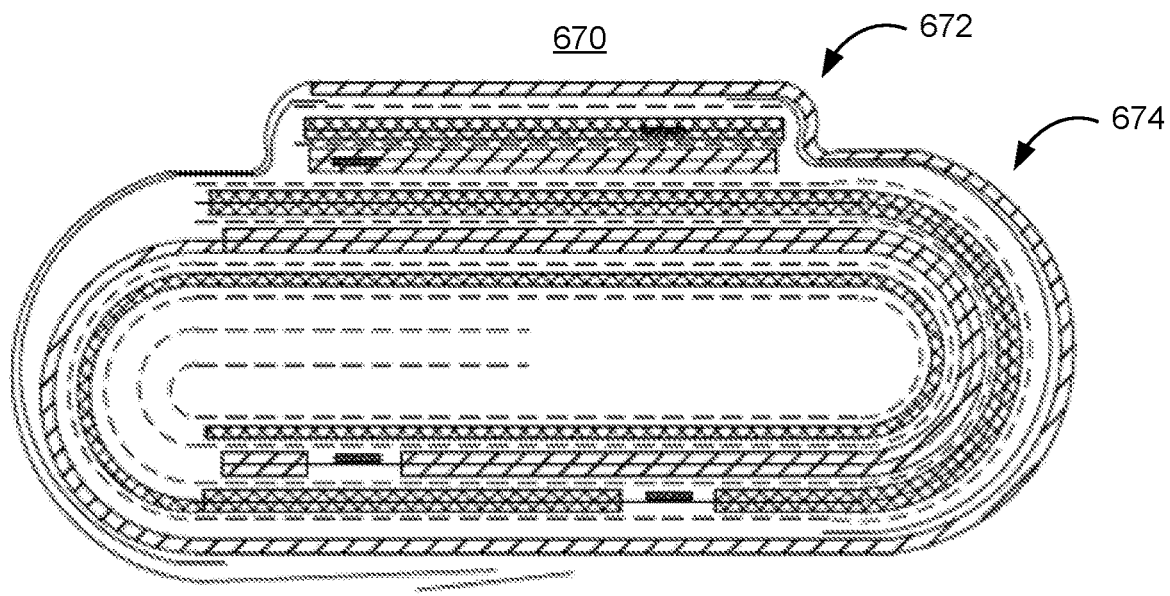

FIG. 6I shows a stepped battery 670 including a step cell 672 having a similar structure as the stacking electrode assembly 250 as discussed with reference to FIG. 2D, and a main cell 604 having a similar structure as the main electrode assembly 340 as discussed with reference to 3C.

Figure 6J:
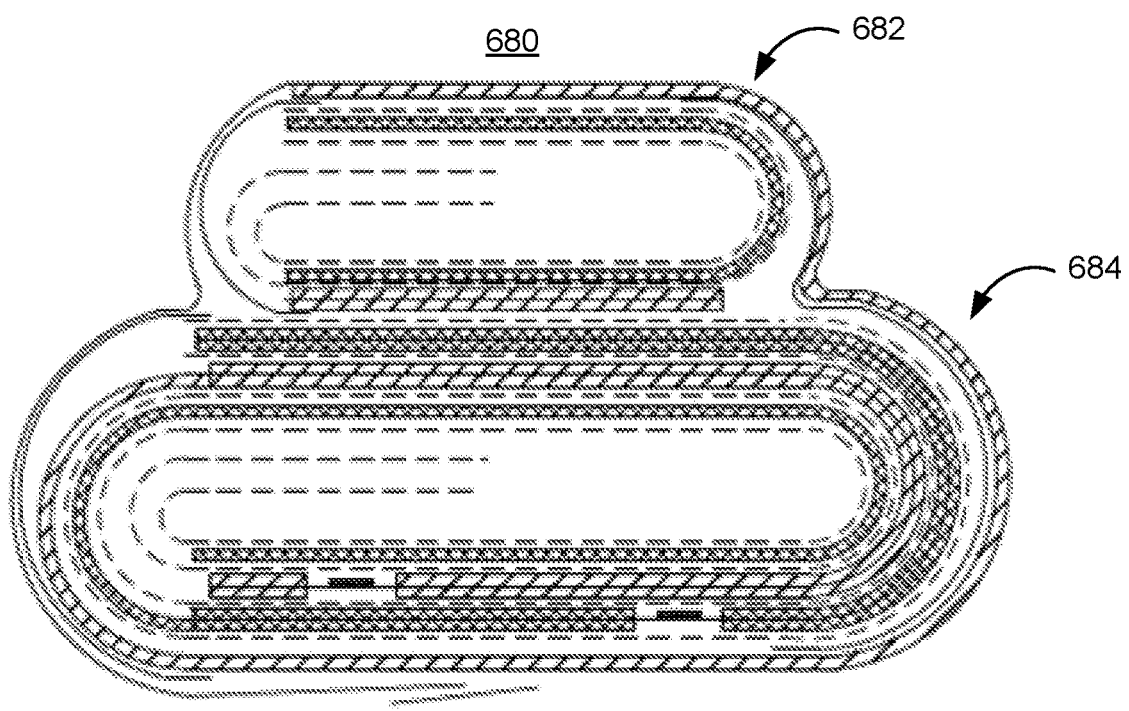

FIG. 6J shows a stepped battery 680 including a step cell 682 having a similar structure as the main electrode assembly 440 and the first and second electrodes 400 and 410 as discussed with reference to FIGS. 4A-4C, and a main cell 684 having a similar structure as the main electrode assembly 340 as discussed with reference to 3C.

Figure 6K:
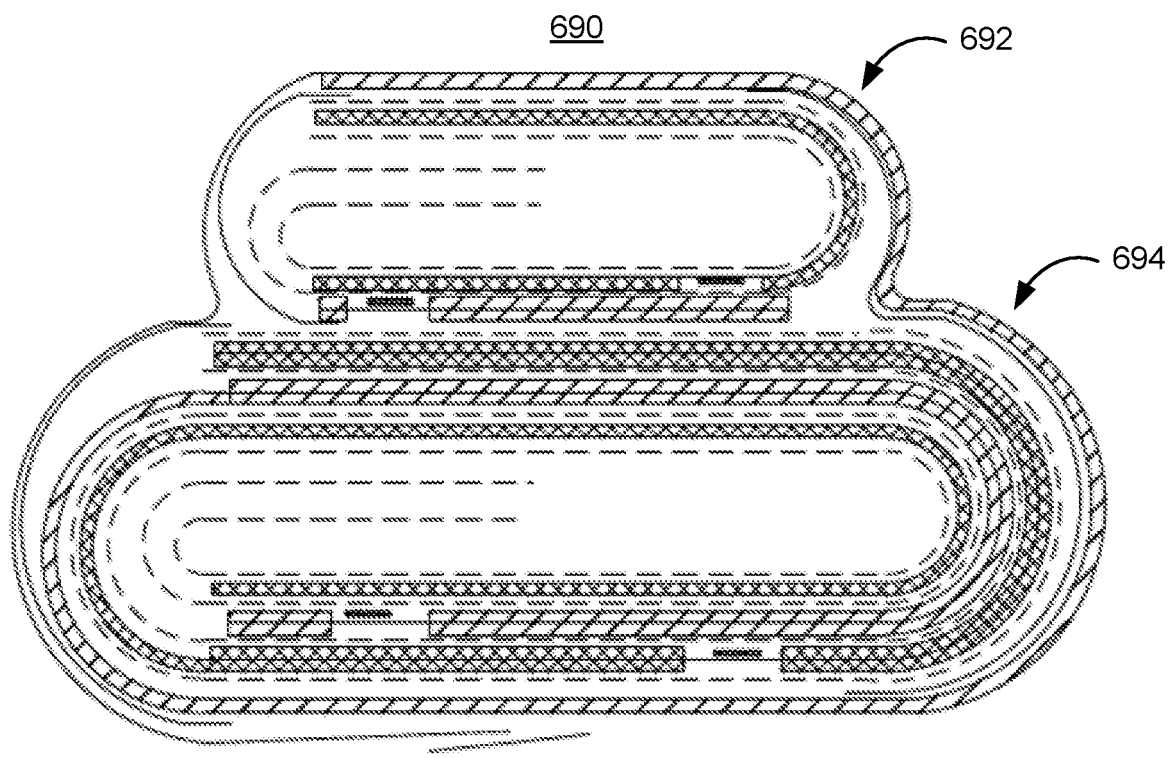

FIG. 6K shows a stepped battery 690 including a step cell 692 having a similar structure as the electrode assembly 340 and the first and second electrodes 300 and 310 as discussed with reference to FIGS. 3A-3C, and a main cell 684 having a similar structure as the main electrode assembly 340 as discussed with reference to 3C.

Figure 7A:
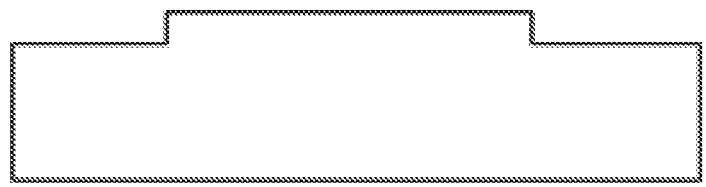
FIGS. 7A-7C are schematic diagrams illustrating various embodiments for stacking the step batteries, in accordance with some embodiments.
Figure 7B:
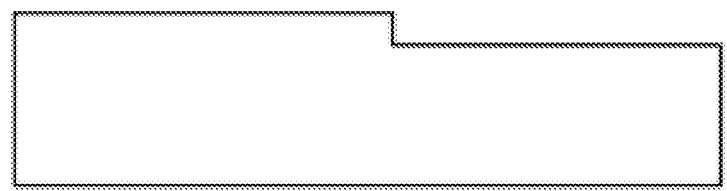
Figure 7C:
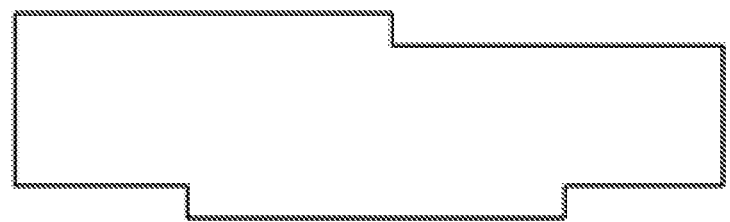

FIGS. 7A-7C are schematic diagrams illustrating various embodiments for stacking the step batteries, in accordance with some embodiments. In some embodiments as illustrated in FIG. 7A, a step cell is disposed on a main cell, and the step cell is placed in the middle of the main cell. In some embodiments as illustrated in FIG. 7B, a step cell is disposed on a main cell, and the step cell is placed on one side of the main cell. In some other embodiments as illustrated in FIG. 7C, a first step cell is stacked on a main cell and placed on one side of the main cell, and a second step cell is stacked below the main cell and placed in the middle of the main cell. Thus two or more cells can be stacked in various ways to provide different shapes of the stepped battery, to accommodate devices having different shapes and/or limited space for the battery.

It is noted that the figures as discussed in the description of the embodiments herein are for illustration purpose only and are not intended to limit the scope of claims. For example, the different segments in the electrodes as illustrated in FIGS. 1A-1B, 3A-3B, and 4A-4B are not intended to be limited to the lengths, proportions, numbers, and/or locations as shown in the figures. In some embodiments, the single-side segments can be longer than the double-side segments. In some embodiments, the uncoated segments (located at head or tail) can be longer than the double-side segments. In some embodiments, numbers of various types of segments may vary according to the need of battery design and manufacturing. Modifications, variations, and alternative embodiments will be apparent to those of ordinary skill in the art having the benefit of the illustrations presented in the foregoing descriptions and the associated drawings.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode assembly could be termed a second electrode assembly, and, similarly, a second electrode assembly could be termed a first electrode assembly, without departing from the scope of the embodiments. The first electrode assembly and the second electrode assembly are both electrode assemblies, but they are not the same electrode assembly.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various embodiments and to best utilize the underlying principles and various embodiments with various modifications as are suited to the particular use contemplated. Therefore, it is to be understood that the scope of claims is not to be limited to the specific examples of the embodiments disclosed and that modifications and other embodiments are intended to be included within the scope of the appended claims.

What is claimed is:

1. A battery, comprising:
a first electrode assembly being a jelly-roll cell including a first electrode; and
a second electrode assembly disposed adjacent the first electrode assembly along a first direction;
wherein the first electrode comprises a tail portion including a first segment and a second segment electrically connected to the first segment and following the first segment along a winding direction of the first electrode assembly, the first segment disposed on an outer surface of the second electrode assembly and wrapping the second electrode assembly and the second segment disposed and terminated on the first electrode assembly.

2. The battery of claim 1, wherein the first electrode is a cathode.

3. The battery of claim 1, wherein the first electrode is an anode.

4. The battery of claim 1, wherein the first electrode assembly is shorter than the second electrode assembly along a second direction perpendicular to the first direction.

5. The battery of claim 1, wherein the second electrode assembly is shorter than the first electrode assembly along a second direction perpendicular to the first direction.

6. The battery of claim 1, wherein the second electrode assembly comprises a plurality of cells that are stacked on each other.

7. The battery of claim 1, wherein the second electrode assembly comprises a jelly-roll cell.

8. The battery of claim 1, wherein the second segment wraps around a portion of the first electrode assembly.

9. A battery, comprising:
a first electrode assembly being a jelly-roll cell including a first electrode; and
a second electrode assembly disposed adjacent the first electrode assembly along a first direction;
wherein the first electrode comprises a tail portion including a first segment and a second segment electrically connected to the first segment and following the first segment along a winding direction of the first electrode assembly:
the first segment, disposed on an outer surface of the second electrode assembly and wrapping the second electrode assembly; and
the second segment disposed and terminated on an outer portion of the first electrode assembly.

10. The battery of claim 9, wherein the first electrode of the first electrode assembly is a cathode.

11. The battery of claim 9, wherein the first electrode of the first electrode assembly and a second electrode of the second electrode assembly are disposed at an interface between the first electrode assembly and the second electrode assembly, and wherein the first electrode of the first electrode assembly and the second electrode of the second electrode assembly participate in an electrochemical reaction.

12. A battery, comprising:
a first electrode assembly being a jelly-roll cell including a cathode; and
a second electrode assembly disposed adjacent the first electrode assembly along a first direction;
wherein the cathode comprises a tail portion including a first segment and a second segment electrically connected to the first segment and following the first segment along a winding direction of the first electrode assembly, the first segment disposed on an outer surface of the second electrode assembly and wrapping the second electrode assembly, and the second segment disposed and terminated on an outer portion of the first electrode assembly, and
wherein each of the first electrode assembly and the second electrode assembly comprises:
a cathode including a cathode current collector and a cathode active material coated on at least a portion of at least one surface of the cathode current collector;
an anode opposite to the cathode and including an anode current collector and an anode active material coated on at least a portion of at least one surface of the anode current collector;
a separator interposed between the cathode and the anode; and
an electrolyte interposed between the cathode and the anode.

* * * * *